(12) United States Patent
Hershtig

(10) Patent No.: US 6,212,404 B1
(45) Date of Patent: Apr. 3, 2001

(54) CRYOGENIC FILTERS

(75) Inventor: Rafi Hershtig, Salisbury, MD (US)

(73) Assignee: K&L Microwave Inc., Salisbury, MD (US)

( * ) Notice: Subject to any disclaimer, the term of this patent is extended or adjusted under 35 U.S.C. 154(b) by 0 days.

(21) Appl. No.: 09/124,060

(22) Filed: Jul. 29, 1998

Related U.S. Application Data

(60) Provisional application No. 60/054,479, filed on Aug. 1, 1997, and provisional application No. 60/055,182, filed on Aug. 8, 1997.

(51) Int. Cl.$^7$ .................................................. H04H 1/036
(52) U.S. Cl. ............................ 455/561; 455/14; 333/208; 333/99 S; 343/890
(58) Field of Search .................................. 333/208, 212, 333/99 R, 99 S; 343/890, 891; 455/254, 14, 15, 561

(56) References Cited

U.S. PATENT DOCUMENTS

| | | |
|---|---|---|
| 3,389,352 | 6/1968 | Kliphuis . |
| 3,564,546 * | 2/1971 | Barney et al. ................. 333/99 R X |
| 3,644,803 | 2/1972 | Levi . |
| 3,845,424 * | 10/1974 | Martens ........................ 333/99 R X |
| 3,902,143 * | 8/1975 | Fletcher et al. .................... 33/248 X |
| 4,571,954 | 2/1986 | Roberts et al. ................. 333/99 S X |
| 4,585,999 | 4/1986 | Hilbert et al. . |
| 4,763,132 | 8/1988 | Juds et al. . |
| 4,799,067 | 1/1989 | Tekip et al. . |
| 5,006,825 | 4/1991 | Guilbert et al. . |
| 5,052,183 | 10/1991 | Koscica et al. ........................ 62/51.1 |
| 5,093,311 | 3/1992 | Shiota et al. . |
| 5,179,074 * | 1/1993 | Fiedziuszko et al. ......... 333/99 S X |
| 5,244,869 | 9/1993 | Billing . |
| 5,262,395 | 11/1993 | Ginley et al. . |
| 5,378,999 | 1/1995 | Martens et al. . |
| 5,604,925 * | 2/1997 | O'Malley et al. ............. 333/99 R X |

FOREIGN PATENT DOCUMENTS 566282  7/1977  (RU) .

OTHER PUBLICATIONS

*Microwaves & R&F*, "Cooled Filter/LNA Assembly Enhances Cellular Coverage," Aug. 1997, Circle No. 51, pp. 172–178.

*Wireless Design & Development*, "Optimizing Base Station Receiver Front Ends," Aug. 1997, Garrison, S., pp. 55–57.

"Development of a Low Cost, Cryogenic Refrigeration System for Cooling of Cryoelectronics," W.A. Little and I. Sapozhnikov (1994), pp. 1–8.

* cited by examiner

*Primary Examiner*—Benny T. Lee
(74) *Attorney, Agent, or Firm*—Banner & Witcoff, Ltd.

(57) ABSTRACT

A cryogenic waveguide cavity filter for use in a wireless communication systems.

13 Claims, 18 Drawing Sheets

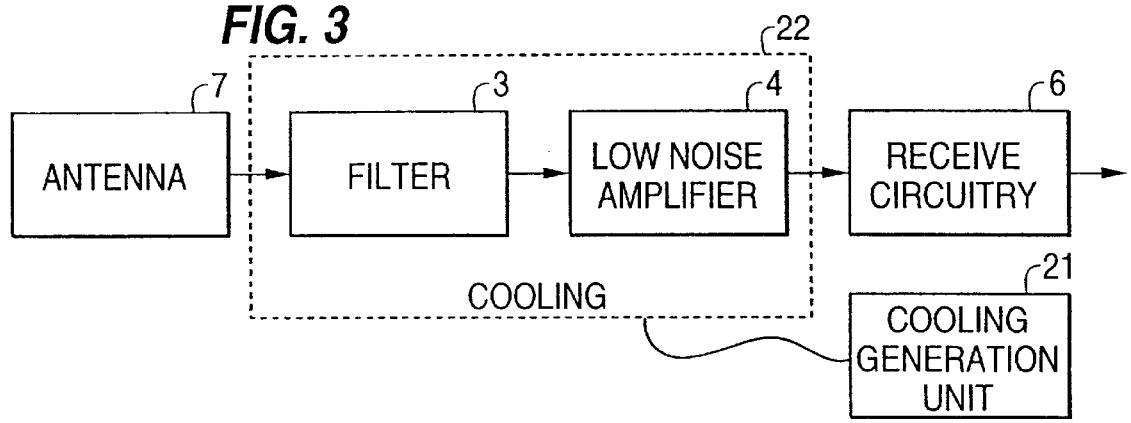
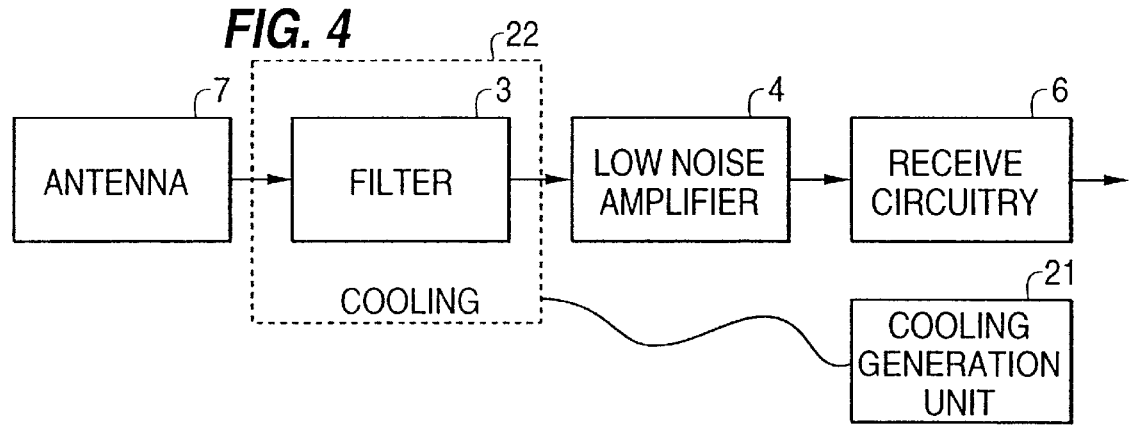
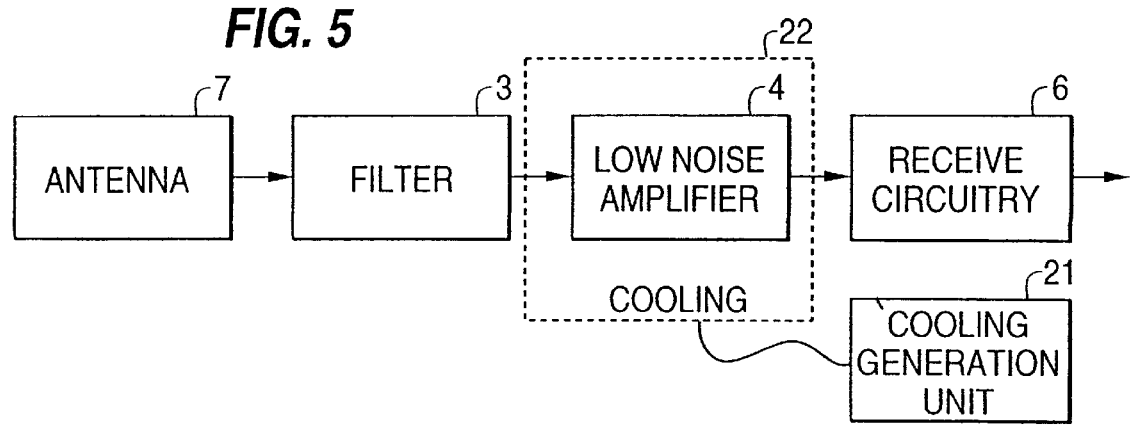

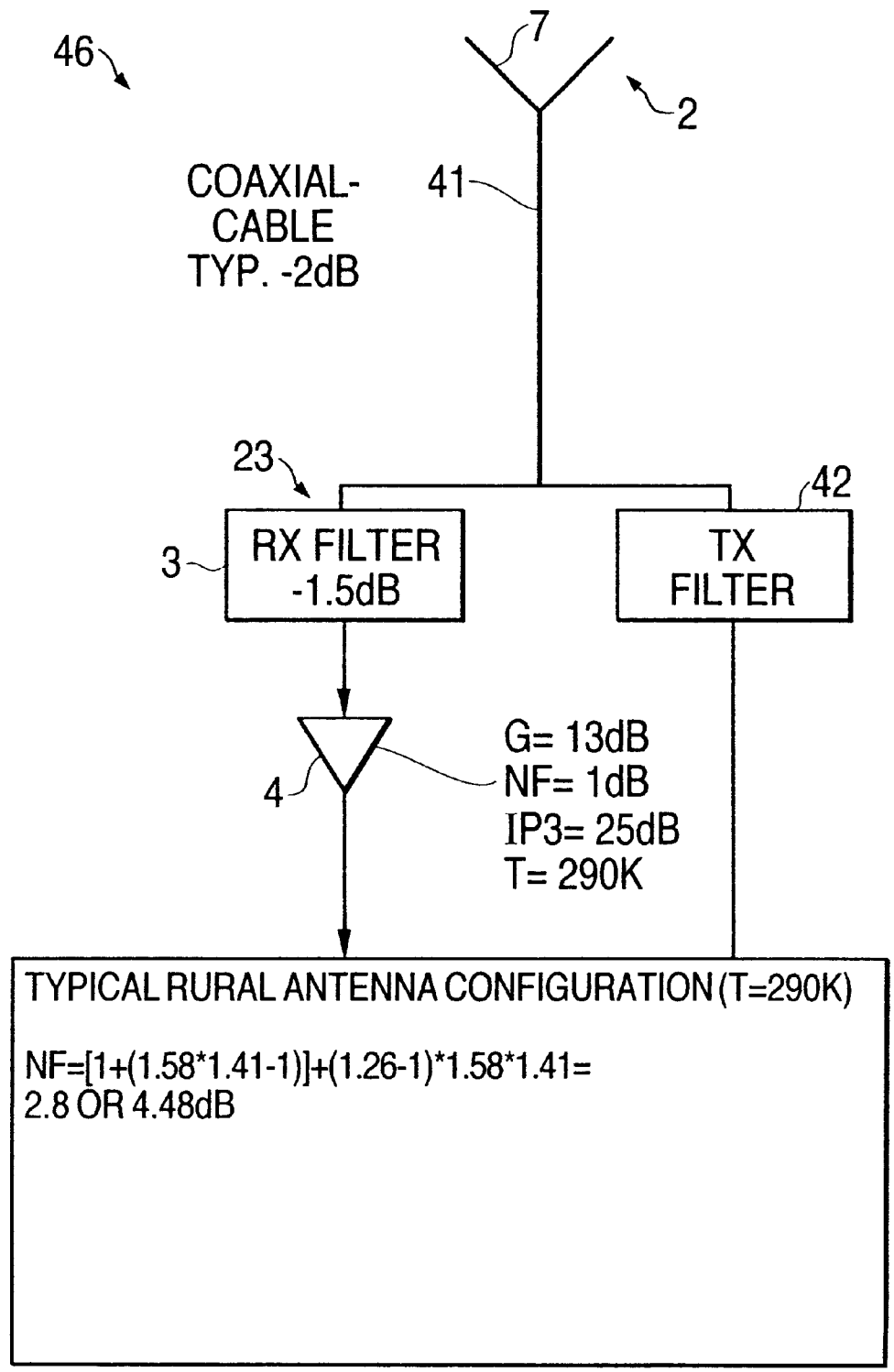

FIG. 22

COMPARING THE ADVANTAGES AND DISADVANTAGES IN CRYOGENIC TECHNOLOGIES FOR WIRELESS SYSTEMS

| FEATURES AND PERFORMANCE | CRYOGENIC CERAMIC FILTERS | HTS FILTERS |
|---|---|---|
| FILTER ARCHITECTURE | CERAMIC LOADED WAVEGUIDE, $TE_{10}$ MODE NEARLY IDEAL SYMMETRIC/ASYMMETRIC ELLIPTICAL RESPONSE | PLANAR (MICROSTRIP) SKEWED FREQUENCY RESPONSE DIFFICULT TO CONTROL AND TUNE |
| Q (UNLOADED) | 23,000 @ 300K (NONOPTIMIZED) 30,000 @ 150K (NONOPTIMIZED) | 25,000 @ 60K |
| INTERMODULATION | -169 dBc FOR TWO-TONE INPUT (43 dBm) | LOW I.M. PERFORMANCE |
| THIRD-ORDER INTERCEPT (IP3) | > 100 dBm | 70-80 dBm |
| SYSTEM APPLICATION | BOTH Tx AND Rx PATHS | Rx PATH ONLY (AT THIS TIME) |
| FILTER TEMPERATURE | FILTER MAINTAINS RESPONSE FROM OPERATING TEMPERATURE TO ROOM TEMPERATURE | ELECTRICAL CHARACTERISTICS DEGRADE DRAMATICALLY WHEN TEMPERATURE IS ABOVE THE TRANSITION TEMPERATURE |
| TEMPERATURE STABILITY | ± 2 ppm/°C | -1000 ppm/°C @ 77K -100 ppm/°C @60K |
| MTBF OF COOLER | > 10 YEARS (> 100,000 HOURS) @ 150K | 8,000 HOURS @ 77K |
| COST OF COOLER | LOW | HIGH |
| SIZE OF FILTER | ~100 in³ | ~10 in³ |
| MATERIAL TECHNOLOGY | CONVENTIONAL COMMERCIALLY AVAILABLE DIELECTRICS AND ALLOYS | EPITAXIAL GROWTH OF FOUR CONSTITUENTS MATERIALS, EXOTIC |
| MARKET SUPPORT | AVAILABLE IN MASS PRODUCTION | LIMITED |
| DESIGN TOOLS | CLOSED FORM MODELS EXIST | MODELS UNDER DEVELOPMENT |
| POWER HANDLING | > 100 W FOR A MULTISECTION FILTER | 50 W MAXIMUM |

MEASURED RESPONSE OF CERAMIC FILTER AT 150K

MEASURED TRANSMISSION
AND RETURN LOSS AT 130K

MEASURED IP$_3$ AND 1dB
COMPRESSION AT 130K

CRYOGENIC FILTERS

This application claims the priority of copending application Ser. No. 60/054,479, filed on Aug. 1, 1997, and copending application Ser. No. 60/055,182, filed on Aug. 8, 1997, entitled Cryogenic Filter by the present inventor, both of which are hereby incorporated by reference.

BACKGROUND OF THE INVENTION

This invention relates to cryogenic filters and, in particular, to systems and methods for use in implementing cryogenic filters in wireless communication systems.

As demonstrated by the high prices paid for licenses to portions of the radio frequency spectrum in the United States, there is a need to improve the services that can be provided over a limited bandwidth. This need is particularly critical in the field of cellular phone communication systems. For example, as the self-induced noise of the filter is decreased, the sensitivity of the receiver is increased. Accordingly, the range of the base station may be increased—reducing the number of required base stations. Additionally, as the cut-off characteristics of the filter become sharper, co-channel interference is reduced.

One technique for improving filter response is to utilize high temperature super-conducting (HTS) waveguide filters/amplifiers which operate up to a temperature of 77 degrees Kelvin. However, these filters are not well adapted to mass commercial implementations. HTS cooling systems capable of reaching a temperature of 77 degrees Kelvin suffer from persistent problems of high cost and low reliability. Although HTS filters can be configured to offer low noise characteristics, they nonetheless suffer from a lack of a sharp cut-off characteristic (as compared to elliptical response filters) and temperature instability.

Conventionally, a superconducting filter/LNA operates at temperatures of 77 Kelvin or below. The receive filters are conventionally constructed using either thin film or thick film deposition approaches. In most instances, the LNA is not made of any superconducting materials. The reason for operating both devices at such low temperatures is related to the sharp transition of the loss characteristics of the superconductor. As a result, the unloaded "Q" of the resonator is found to be in order of tens of thousands.

In the case of thin film technology, the filter utilizes a micro-strip media. This implies an elaborate design, which requires extremely accurate models. Often a 3-D simulation is used, to compensate and optimize for the unequal phase velocities of the Even and Odd modes. It is very difficult, by any means, to achieve an elliptical response. The thin film approach is well suited for "roofing" filters, wide pass-bands and low number of sections. Due to the limited rejection, this type of filter is not suitable for co-channel interference. The major advantages of micro-strip filters are miniaturization (in respect to other techniques) and reproducibility.

Thick film technology is based on the idea that TEM resonators can be coated with a superconducting material and cooled. Again cooling at an operating temperature of 77 Kelvin has sever cost and reliability problems. With thick film technology, the size of the filter is closer to a conventional cavity than to micro-strip (thin film) filters. The thick film filters are also problematic in that they exhibit non-linearity and have limited power handling capabilities.

Another method is to coat metallic loaded wave-guide structures with superconducting films. This approach can realize Dual-Mode propagation, which can save a number of resonators, but is extremely expensive and suffers from reliability problems.

In conventional architectures, the filter/amplifier module is physically placed in the base-station, and is connected with a long low-loss coaxial cable to the tower location where the antennas are mounted. The base station mounted filter is usually made of metal cavities, with typical insertion loss of −1.5 dB.

Due to the extreme reliability problems with HTS cooling systems and the fact that HTS filters will not operate when the cooling system is broken, it is usually necessary to construct an entirely redundant path whereby the system can bypass a broken cooling system. Further, tower mounted HTS cooling systems are not practical due to the reliability problems with cooling to HTS temperatures.

Superconductor substrates for HTS filters cost $1,200 even for a small surface areas. Accordingly, the superconducting substrate is limited to one by one or by two by two inches. Because the substrate is mounted on the metal, thermal coefficients of expansion dictate that the metal be a special tungsten copper alloy which is very heavy.

Additionally, for HTS devices, the filters become totally non-functional with a cooling malfunction since the devices cease to be super conductive. Accordingly, these HTS systems are expensive and require complicated redundancy systems.

SUMMARY OF THE INVENTION

Accordingly, objects of one or more aspects of the present invention include solving the above mentioned deficiencies by providing a low noise, high reliability filter system with sharp cut-off characteristics.

In one aspect of the invention, a wave guide cavity filter is cooled to a temperature above those of the HTS filters, e.g., to a cryogenic temperature. As defined in the present specification, cryogenic temperatures are those temperatures above the maximum upper limit of current high temperature super conductors.

In another aspect of the invention, only the low noise amplifier is cooled to cryogenic temperatures to reduce its noise figure so that the filter's operations are facilitated in rural environments (e.g., by increasing the range of the base station).

In other aspects of the invention, only the low noise amplifier is cooled to cryogenic temperatures and mounted on the base station tower near an associated wave guide antenna (e.g., tower mounted).

In still further aspects of the invention, at least three low noise amplifiers are mounted in close proximity and cooled to cryogenic temperatures using a single refrigeration apparatus. In sub-aspects of the invention, the at least three low noise amplifiers may be coupled to a multidirectional array of wave guide antennas. In other embodiments, there may be six or more low noise amplifiers.

In yet further aspects of the invention, the tower mounted amplifiers are cooled by a tower mounted cryogenic refrigerator (e.g., compressor and other cooling components) located proximate to the amplifiers. In this aspect of the invention, no cooling lines are required to be strung along the tower and the amplifiers may be easily mounted anywhere power is present on the tower. In further sub-aspects of the invention, the amplifiers are mounted proximate and coupled to outputs and/or inputs of a plurality of bandpass wave guide cavity filters.

In still other aspects of the invention, only the wave guide filters are cooled to cryogenic temperatures to reduce noise so that the filter's operations are facilitated in urban environments (e.g., by improving the cut-off characteristics of the filter). However, even better improvements may be made where both the filter and the low noise amplifier are both cooled.

In still further aspects of the invention, at least three wave guide filters are mounted in close proximity and cooled to cryogenic temperatures using a single refrigeration apparatus. In sub-aspects of the invention, the at least three wave guide filters may be coupled to a multidirectional array of wave guide antennas. In still further sub-aspects of the invention, the at least three wave guide filters may include six wave guide filters.

In yet further aspects of the invention, the tower mounted wave guide filters and/or low noise amplifiers are cooled by a tower mounted cryogenic refrigerator (e.g., compressor and other cooling components) located proximate to the wave guide filters and/or low noise amplifiers. In this aspect of the invention, no cooling lines are required to be strung along the tower. Further, the wave guide filters may be easily mounted anywhere where power is present on the tower. In sub-aspects of the invention, the wave guide filters are mounted in close proximity to the wave guide antennas and/or to the low noise amplifiers (LNAs).

In yet further aspects of the invention, both the wave guide filters and the low noise amplifiers are both cooled to cryogenic temperatures. Thus, any of the above aspects of the invention may be utilized in any combination. For example, the low noise amplifiers may be mounted on the wave guide filters and both units cooled to cryogenic temperatures. This cooling apparatus may comprise three, six, or more wave guide filter/low noise amplifier units with an associated tower mounted or base-station mounted cooling arrangement. If a tower mounted cooling arrangement is utilized, it may or may not include a proximate refrigeration unit.

The invention may also include any number of methods of filtering which implement one or more portions of the above arrangements.

These and other objects and features of the invention will become apparent upon consideration of the following detailed description of preferred embodiments thereof, presented in connection with the following drawings in which like reference numerals identify like elements throughout. Although the invention has been defined using the appended claims, these claims are exemplary in that the invention is meant to include the elements and steps described herein in any combination or subcombination. Accordingly, there are any number of alternative combinations for defining the invention, which incorporate one or more elements from the existing claims and/or specification (including the drawings) in various combinations or subcombinations.

BRIEF DESCRIPTION OF THE DRAWINGS

FIG. 3 shows a configuration in which a filter and amplifier are cooled.

FIG. 4 shows a configuration in which a filter is cooled.

FIG. 5 shows a configuration in which an amplifier is cooled.

FIG. 12a shows a prior art antenna configuration.

FIG. 22 shows comparisons between cryogenic filters and conventional HTS filters.

DETAILED DESCRIPTION OF PREFERRED EMBODIMENTS

In the receive path of any communication system, the signal exiting the antenna is filtered and amplified. This "first stage" of the filter/amplifier assembly (the "module") greatly effects the sensitivity of the receiver. The required sensitivity level is established in today's wireless communication based on the output power of the hand held phones, along with other parameters. For instance, the older hand held phones were capable of 3 watts of output power, whereas the newer cellular phones are providing no more than 0.6 w of output power. In reality, a base station has "to be responsible" for a smaller area when covering low output power phones, or for covering a larger area with improved sensitivity.

The sensitivity can be improved by reducing the noise figure (NF) at the front end of the receiver, which translates to the ability to detect weaker signals. Thus, embodiments of the present invention seeks to maintain a high Signal to Noise Ratio (SNR) and a sharp cut-off filter characteristics before mixing the signal with a local oscillator in a receiver for down conversion and de-modulating. Both the signal-to-noise ratio and the cut-off filter characteristics may be extremely important to both Service Providers and original equipment manufacturers (OEM's).

Embodiments of the present invention include a structure for the module which provides a noise figure (NF) similar to a conventional superconducting filter system but at a lower cost, increased reliability, and with improved cut-off characteristics.

Although, the embodiments and methods described in the present application are generally oriented to the fast growing wireless communication's market place, the same approach is applicable to other type of RF applications. For example, radar and communication, where reducing the NF of the front end translates to increasing the detectable range as given by the Friis formula, is an appropriate application for the systems and methods described herein.

Figure 1:
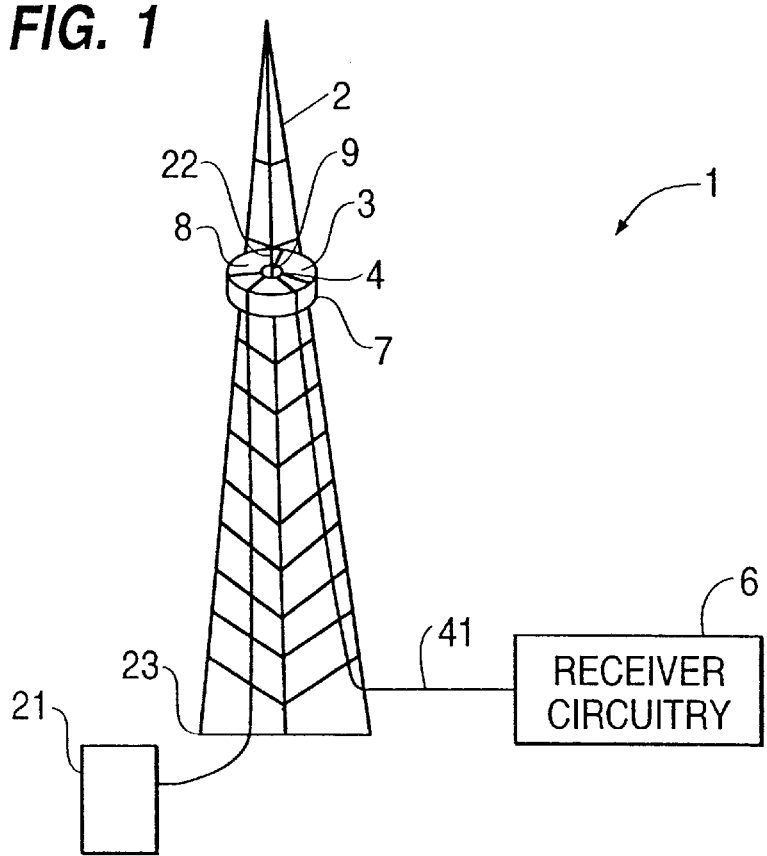
FIG. 1 shows a wireless communication system with a base mounted cooling generation unit.

Referring to FIG. 1, an example of a wireless communication system 1 in accordance with aspects of the present invention is shown. For example, the wireless communication system 1 may include a tower 2, one or more antennas 7, coupled to a module 9 which may include a filter 3 (e.g., a bandpass wave guide cavity filter) and/or a low noise amplifier 4 (LNA), coupled to receiver circuitry 6 via one or more coaxial cables 41. The filter 3 and/or LNA 4 may be cooled to cryogenic temperatures using any suitable cryogenic refrigeration unit which may, for example, include a heat exchange unit 22 and a cooling generation unit 21.

For example, FIG. 3 shows an architecture where both one or more filters 3 and one or more LNAs 4 are cooled by heat exchange unit 22. Similarly, FIG. 4 shows an architecture where only one or more filters 3 are cooled by heat exchange unit 22. Similarly, FIG. 5 shows a configuration where only one or more low noise amplifiers 4 are cooled. The cooling generation unit 21 may be mounted at a remote location such as near a base 23 of tower 2, as shown in FIG. 1.

Figure 2:
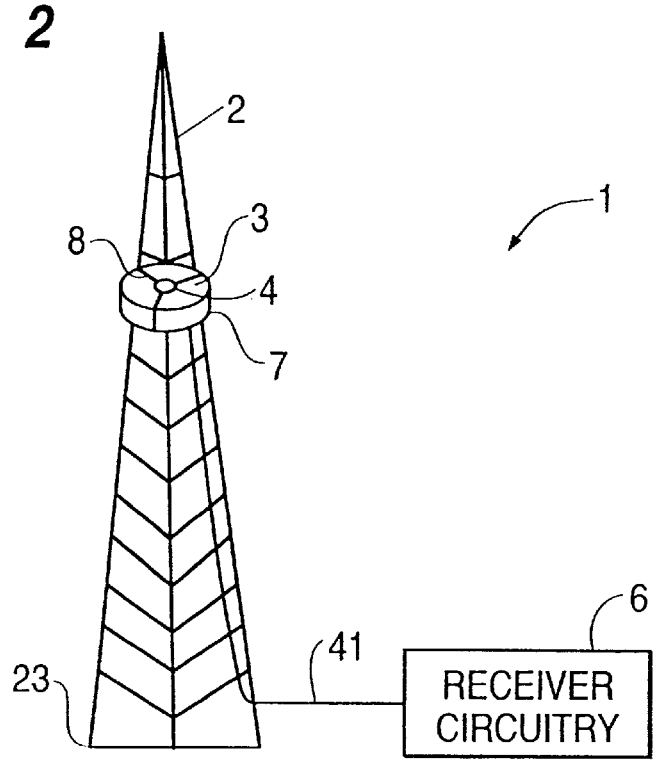
FIG. 2 shows a wireless communication system with a tower mount cryogenic refrigeration unit.
Figure 6:
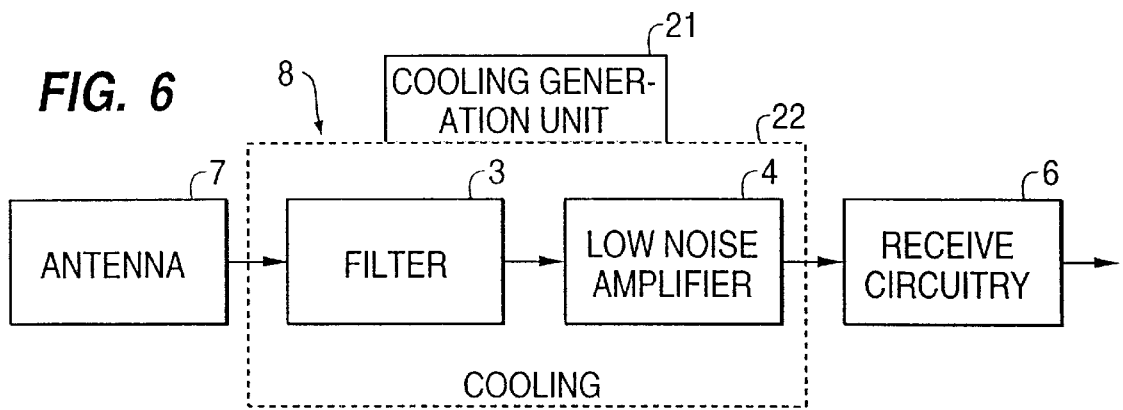
FIG. 6 shows a configuration with a cooling generation unit mounted near a heat exchange unit and in which a filter and amplifier are cooled.
Figure 7:
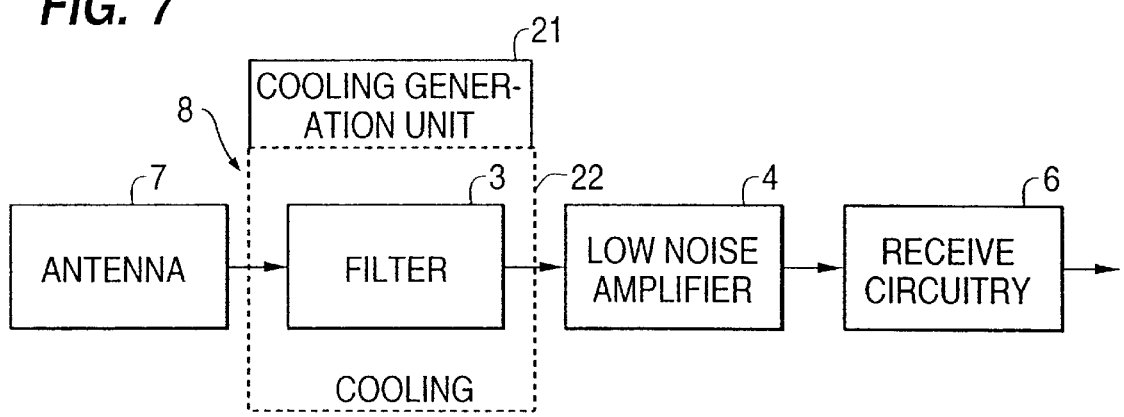
FIG. 7 shows a configuration with a cooling generation unit mounted near a heat exchange unit and in which a filter is cooled.
Figure 8:
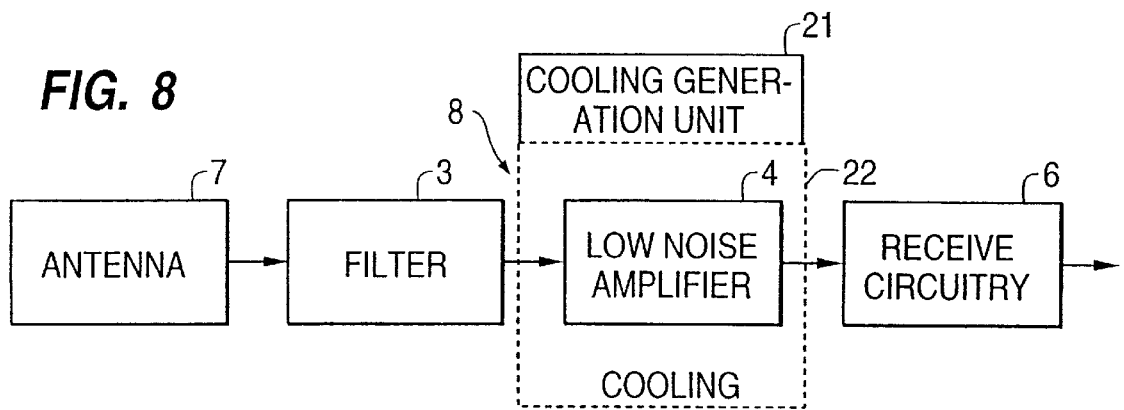
FIG. 8 shows a configuration with a cooling generation unit mounted near a heat exchange unit and in which an amplifier is cooled.

Alternatively, as illustrated in FIG. 2, the heat exchange unit and cooling generation unit may be co-located in a single cryogenic refrigeration unit 8 and mounted on the tower 2 (i.e., tower mounted) near the antenna 7, filter 3, and/or LNA 4. For example, FIGS. 6–8 show illustrative examples where the either the LNAs 4, filters 3, or both are cooled using a tower mounted cryogenic refrigeration unit 8 which may, for example, include a cooling generation unit 21 proximately mounted to a heat exchange unit 22.

Figure 9:
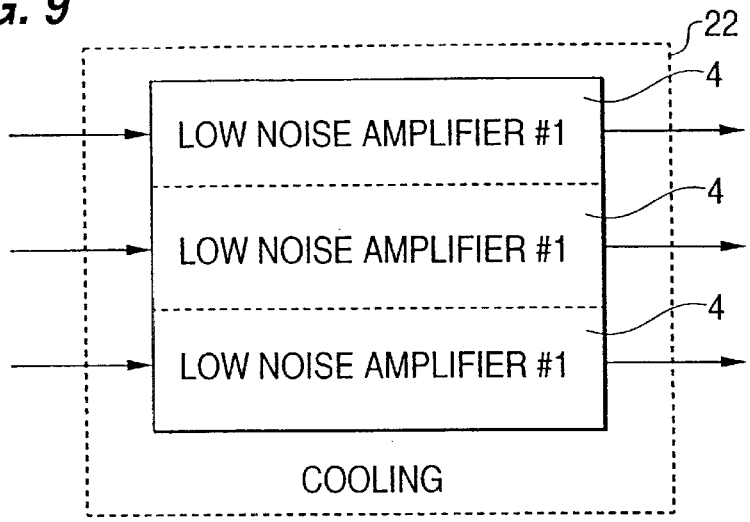
FIG. 9 shows a configuration in which three LNAs are cooled within a heat exchange unit.
Figure 10:
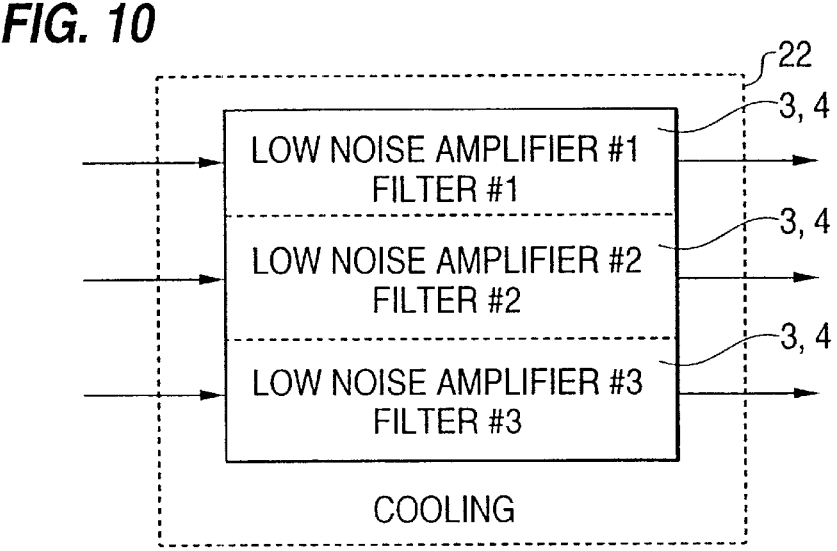
FIG. 10 shows a configuration in which three LNAs and three filters are cooled within a heat exchange unit.
Figure 11:
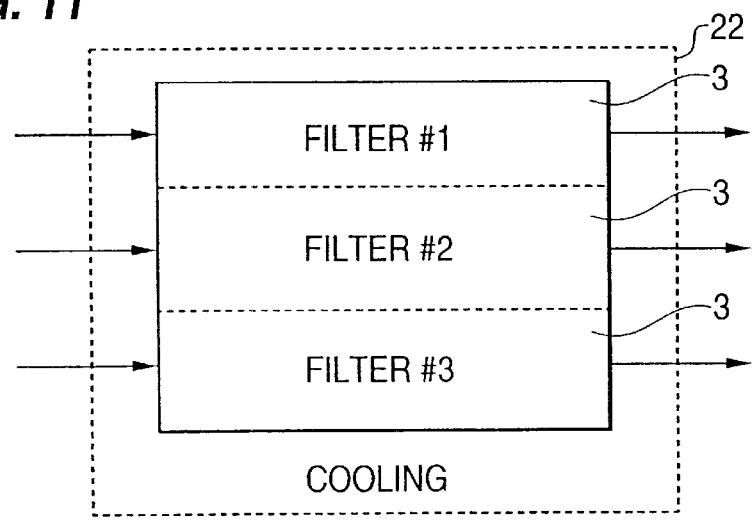
FIG. 11 shows a configuration in which three filters are cooled within a heat exchange unit.

FIGS. 9–11 illustrate alternate embodiments where a plurality of low noise amplifiers and/or bandpass filters are cooled to cryogenic temperatures. In FIGS. 9–11, one, two, three, four, five, six, or more LNAs 4 and/or filters 3 may be co-located and cooled with a heat exchange unit 22 and an associated tower mounted or remote (e.g., base-mounted) cooling generation unit 21 (not shown). For example, where a plurality of antennas 7 are configured in arrays (e.g., three, four, five, six, seven, eight, or nine element arrays), it may be desirable to include a separate LNA and/or filter 3 for each antenna and to cool these components in one or more proximate heat exchange units. In the embodiments illustrated in FIGS. 9–11, a single heat exchange unit is utilized for three LNAs 4 and/or filters 3. In embodiments where more than a single component is disposed within a heat exchange unit 22, it may be desirable to thermally couple the components together such that a single cooling finger (not shown) may cool a plurality of components.

Figure 12B:
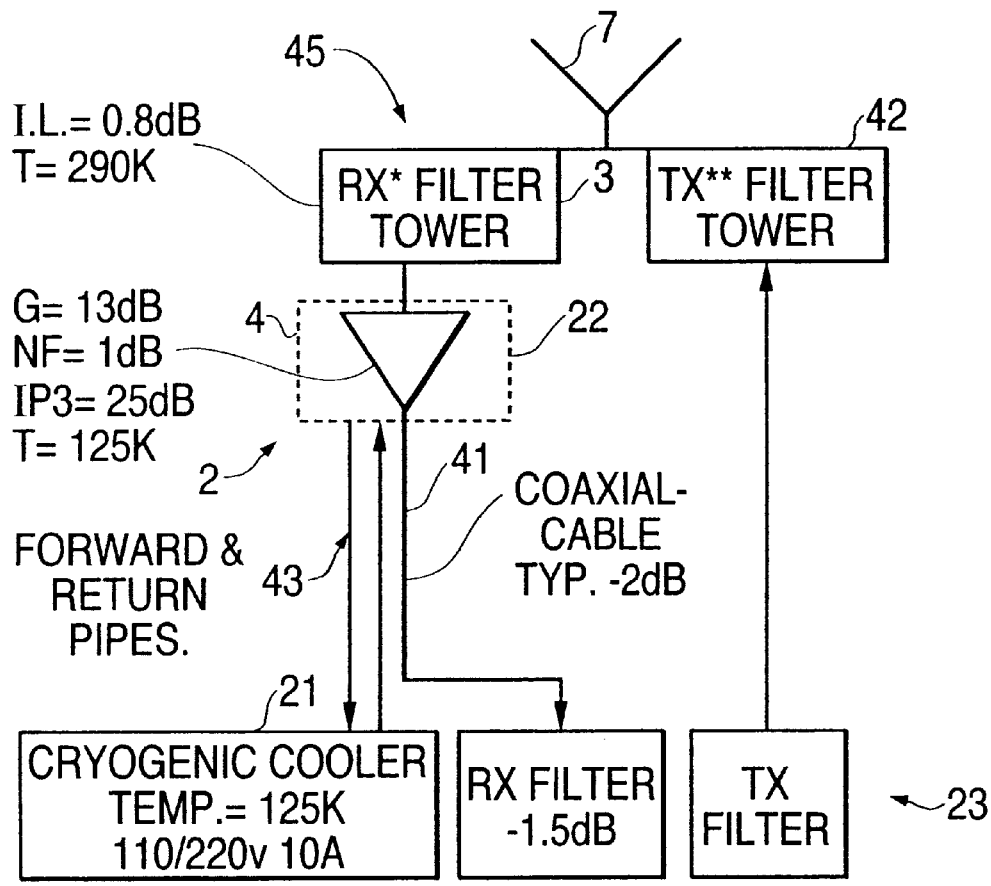
FIG. 12b shows the response of a configuration in which an LNA is cooled by a tower mounted heat exchanger and a cooling exchange unit mounted near the base of a tower.

FIGS. 12(a)–17 show various cryogenic architectures 45 for retrofitting conventional microwave receive station architectures 46. For example, FIG. 12b shows an architecture where the LNA 4 only is cooled by a tower mounted heat exchange unit 22 and a cooling exchange unit mounted near the base 23 of the tower (not shown). FIG. 12a shows a conventional architecture 46 where the antenna 7 is coupled to a receive filter 3 and LNA 4 mounted at the base 23 of the tower (not shown). Note that by cooling the LNA and mounting both the LNA and the receive filter near the top of the tower, the noise figure NF has been reduced by 3.15 dB.

Figure 13:
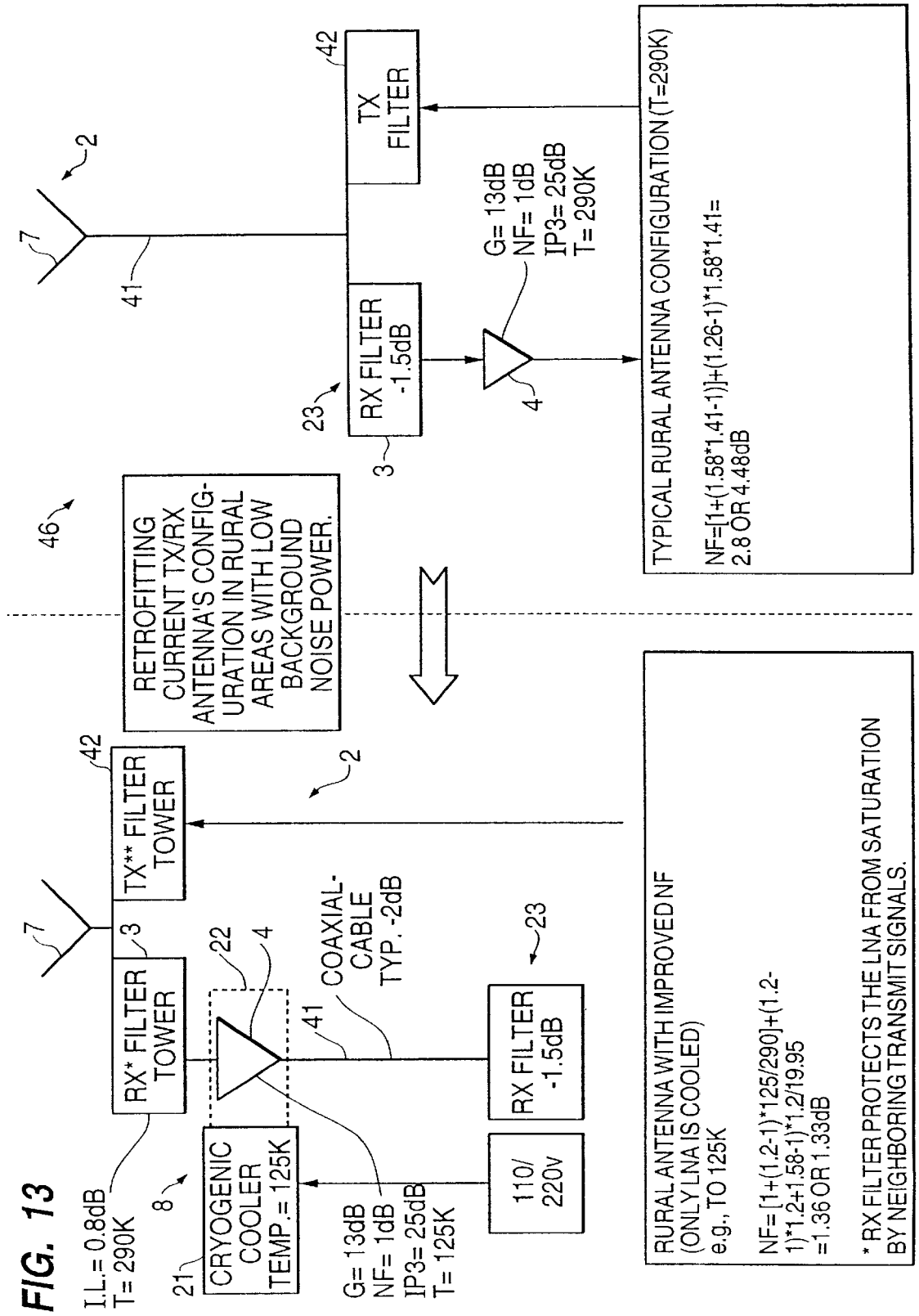
FIG. 13 compares the response of a configuration in which an LNA is cooled by a tower mounted heat exchanger and a cooling exchange unit mounted on the tower to a conventional configuration.

FIG. 13 is similar to FIG. 12(a) except that the cooling generation unit 21 is tower mounted along with the heat exchange 22. Accordingly, there is no need to string insulated forward and return pipes 43, as shown in the FIG. 12(b) embodiment. This helps efficiency of the cryogenic refrigeration unit 8. Additionally, because only the LNA is cooled, the cryogenic refrigeration unit 8 may be miniaturized so that it only needs to accommodate one, two, three, four, five, six, seven, eight, nine, or more LNAs. Since these LNAs are integrated circuits, it is possible to put a plurality of them in a relatively small heat exchange unit 22 and cool this unit using a relatively small cooling generation unit 21. Since approximately 75% of the power is consumed by the filter 3, cooling of only the LNAs 4 facilitates tower mounting of the entire refrigeration unit 8 as a packaged item. Tower mounting of the entire refrigeration unit and cooling of only the LNAs 4 provides a convenient retrofit to conventional architectures 46 while substantially increasing the sensitivity of the base station.

In embodiments where only the LNA(s) are cooled, the components to be cooled are very small. Accordingly, the cryogenic refrigeration unit 8 itself may be miniaturized which facilitates tower mounting. In some cases, the tower can be over 200 feet tall. Thus, there are significant inefficiencies in pumping cooling fluid 200 feet to reach the heat exchange unit 22 on the top of the tower.

Further, where only the LNA(s) are to be cooled, the LNA(s) may be mounted directly on a cooling finger (not shown) and disposed in a vacuum sealed chamber. A vacuum chamber thermally insulates the LNA(s) so there is no heat build-up that you have to worry about because there is no heat transfer. Once the LNA(s) are cooled and in a vacuum, the LNA(s) will stay cool.

The LNA may be either in a ceramic or plastic package. It may be desirable to package the LNA in a ceramic package to facilitate heat transfer. The LNA may be variously mounted and may be configured to be in direct contact with the source of the cold temperature, e.g., the cooling finger.

Figure 14:
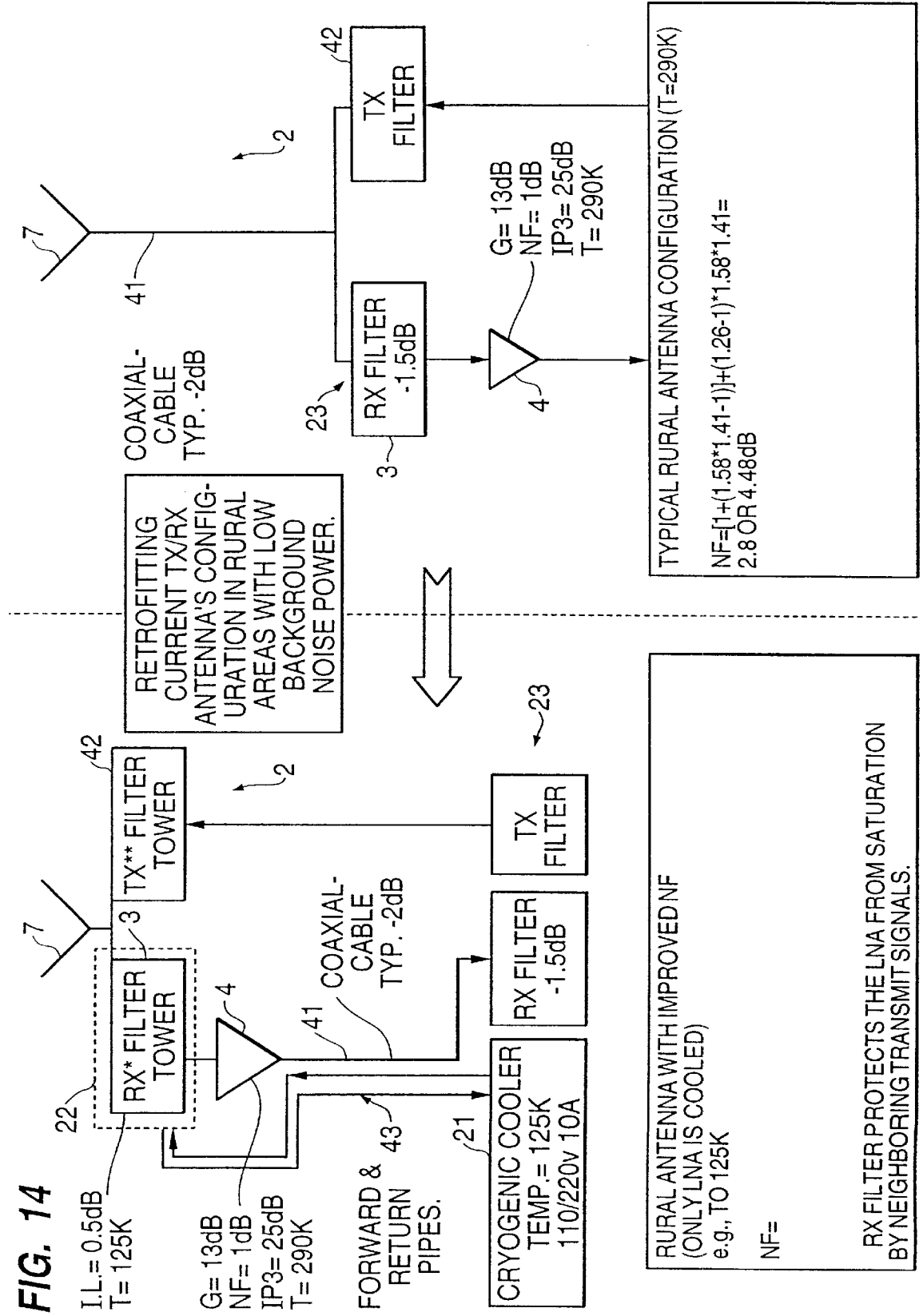
FIG. 14 compares the response of a configuration in which a filter is cooled by a tower mounted heat exchanger and a cooling exchange unit mounted near the base of a tower to a conventional configuration.

FIG. 14 is similar to FIG. 13 except that only the filter 3 is cooled by a tower mounted heat exchange unit 22. By cooling the LNA and mounting both the LNA and the receive filter near the top of the tower, the noise figure NF is reduced slightly and the characteristics of the filter function are greatly improved. For example, where the filter 3 is a bandpass filter, the cut-off characteristics of the filter become substantially sharper.

Figure 15:
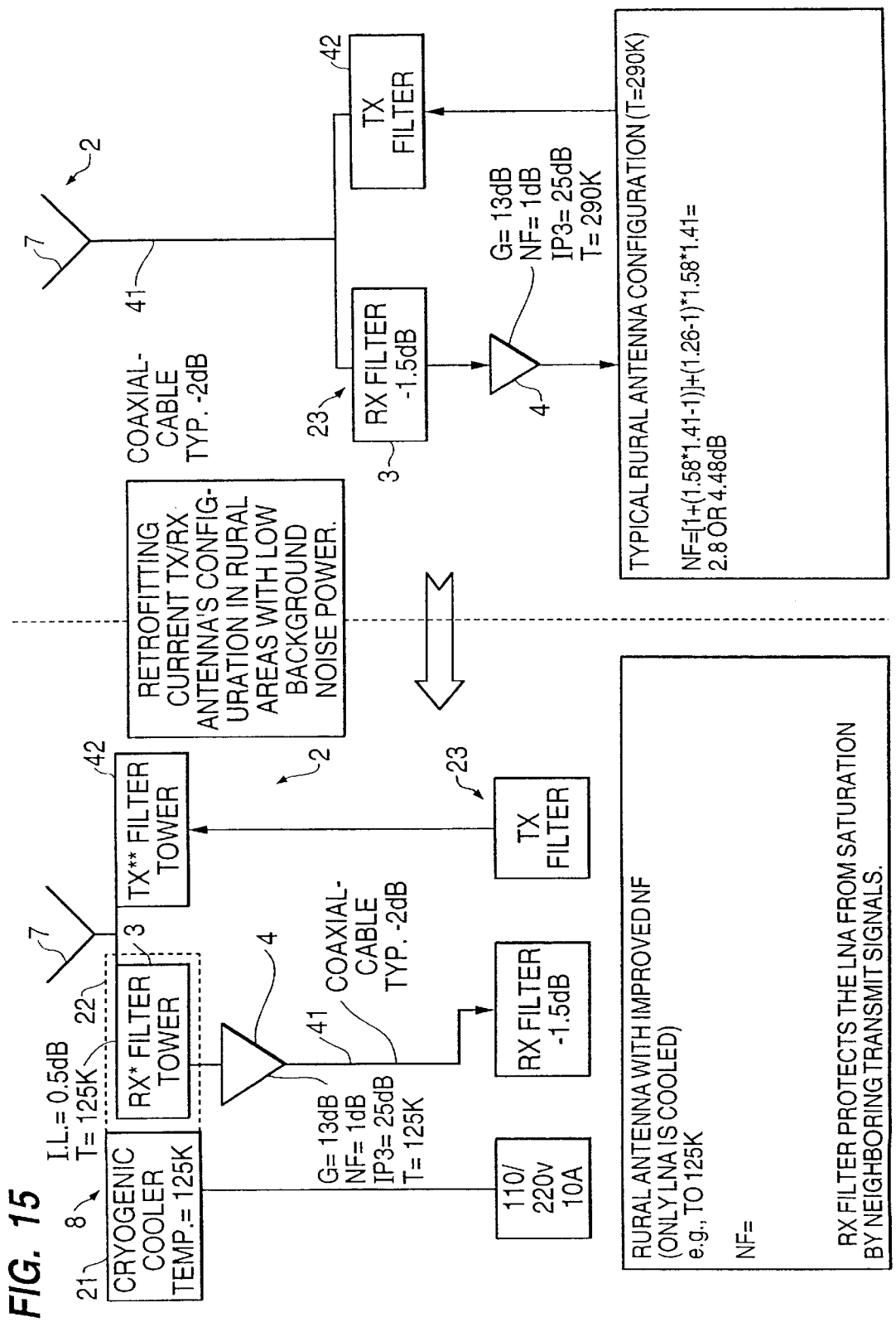
FIG. 15 compares the response of a configuration in which a filter is cooled by a tower mounted heat exchanger and a cooling exchange unit mounted on the tower to a conventional configuration.

FIG. 15 is similar to FIG. 14 except that the cooling generation unit 21 is tower mounted along with the heat exchange unit 22. Accordingly, there is no need to string insulated forward and return pipes 43 along the length of the tower—which helps the efficiency of the cryogenic refrigeration unit 8. Additionally, because only the filter 3 is cooled, the increased band rejection characteristics are achieved without the additional cooling necessary to cool the LNAs. In urban areas or other environments where high background noise levels are present, a low noise figure NF is not a critical. However, it is often important to have a filter 3 with sharp cut-off characteristics. Accordingly, the cooling capacity may be reduced by, for example, 25% where only the filter 3 is cooled. Accordingly, it is only necessary to tower mount a substantially smaller cryogenic refrigeration unit 8. Where two, three, four, five, six, seven, eight, nine, or more filters 3 are to be cooled, it may be desirable to thermally couple the units together such that a single cooling finger (not shown) may cool all of the filters 3. Tower mounting of the entire refrigeration unit and cooling of only the filters 3 provides a convenient retrofit to conventional architectures 46 while substantially increasing the rejection of neighboring signals in urban areas.

Figure 16:
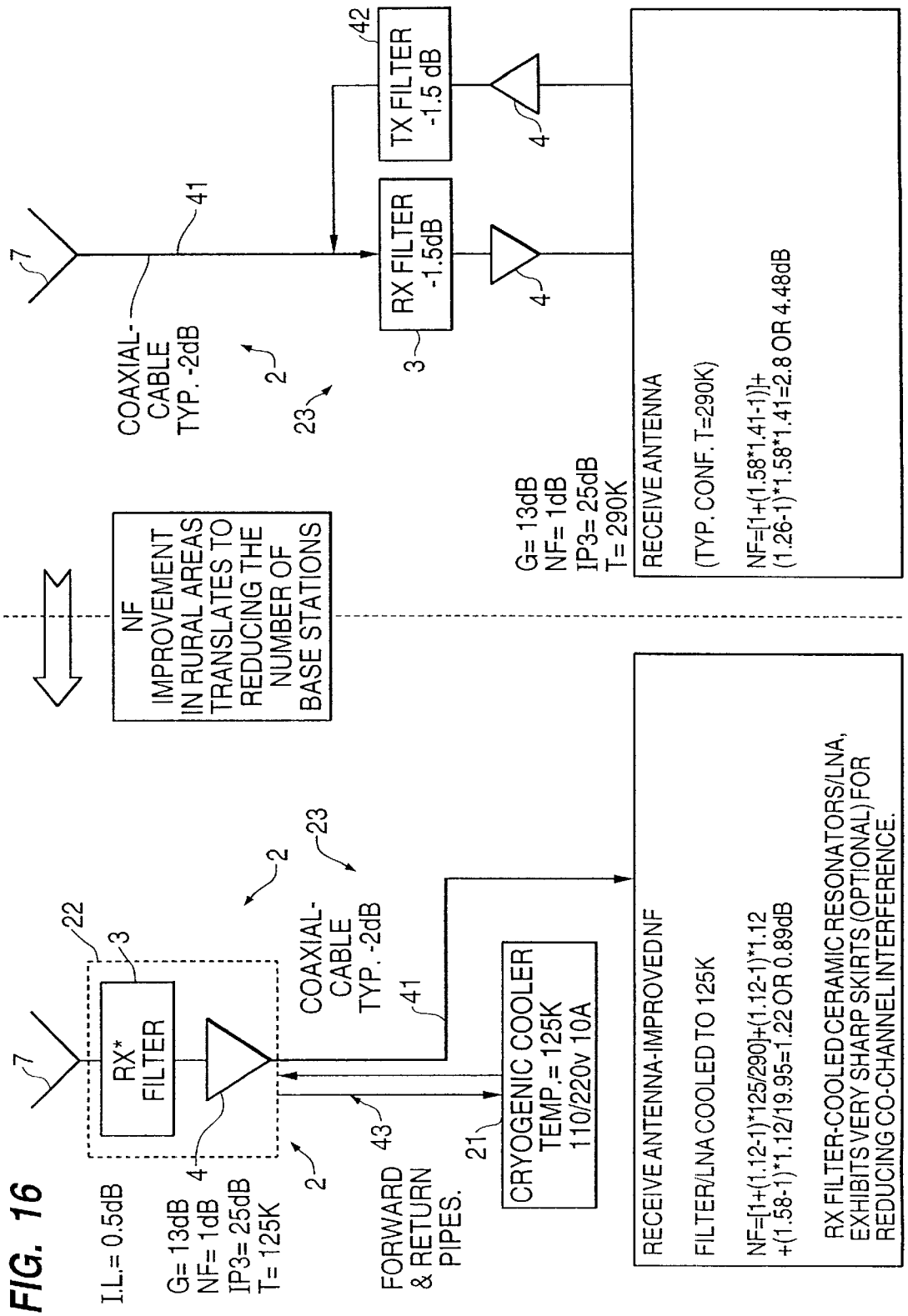
FIG. 16 compares the response of a configuration in which a filter and LNA are cooled by a tower mounted heat exchanger and a cooling exchange unit mounted near the base of a tower to a conventional configuration.

FIG. 16 is similar to FIGS. 12 and 14 except that both the filter(s) 3 and the LNA(s) 4 are cooled by a tower mounted heat exchange unit 22. By cooling both the LNA(s) and the filter(s) 3, both the noise figure NF and the filter characteristics are greatly improved. In the illustrated example, the noise figure NF is improved by 3.59 dB.

Figure 17:
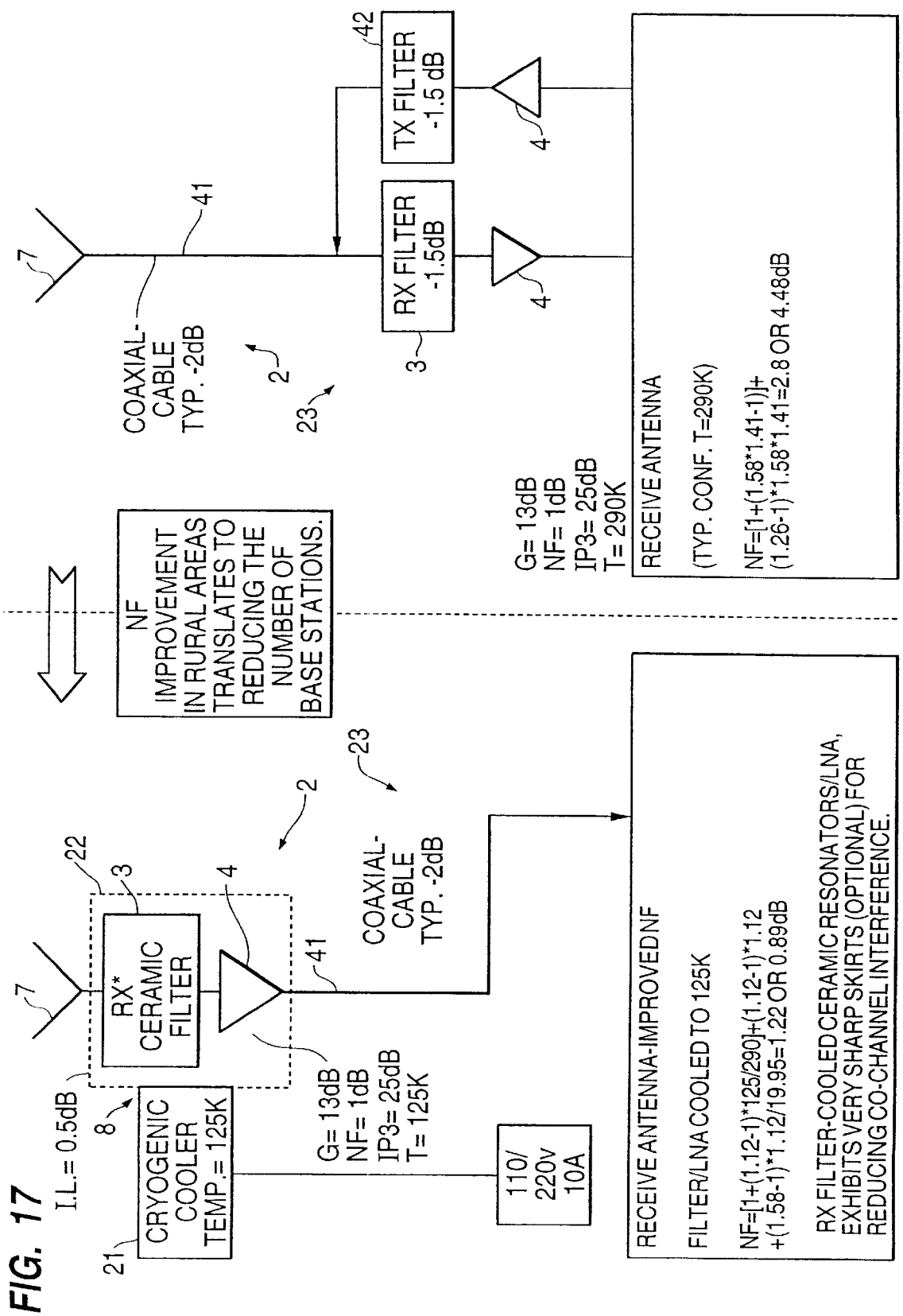
FIG. 17 compares the response of a configuration in which a filter and LNA are cooled by a tower mounted heat exchanger and a cooling exchange unit mounted on the tower to a conventional configuration.

FIG. 17 is similar to FIG. 16 except that the cooling generation unit 21 is tower mounted along with the heat exchange unit 22. Accordingly, there is no need to string insulated forward and return pipes 43 along the length of the tower.

Where the cooling finger is coupled to a filter 3, the filter 3 may be so big that the mass of the filter actually represents a continuation of the cooling finger. Thus, the LNA may be mounted directly to the cavity filter and receive its cooling via the cavity filter. In this manner, the LNA 4 may be mounted in close proximity to an output of the filter 3 while still being cooled to cryogenic temperatures. Due to the huge mass differential ratio between the filter and the LNA, the LNA 4 may utilize the filter as a continuation of the cooling finger. In exemplary configurations, the LNA is mounted close to the output of the cavity filter to minimize spurious noise.

Every cooling arrangement has a cooling capacity which is a function which is a function of the operation and temperature. In other words, the cooling capacity of the cooler is optimized for a certain temperature range. By operating at significantly above HTS temperatures (e.g., at cryogenic temperatures), the cooling capacity for a given cooling arrangement is increased many times. The power dissipation of typical a typical LNA/filter combination is only about two to three watts. Of this, 75% of the power is dissipated by the wave guide cavity filter and 25% is dissipated by the LNA. Thus, cooling only the LNA and operating at cryogenic temperatures allows a miniaturized cryogenic refrigeration unit to be tower mounted.

FIGS. 1–17 provide various cryogenic architectures which may be utilize either individually, or in combination with one or more elements from the other cryogenic architectures. Additionally, each of the architectures described above may utilize one or more of the components and/or methods described below in any combination or subcombination.

Tower and Antennas

The tower 2 may alternately be replaced with any elevated structure such as a building, a rise, mountain, or other man-made or natural structure. The antenna 7 may be variously configured to include any suitable antenna configuration and arrangements of one or more antennas. For example, the antenna 7 may be a unidirectional antenna or a multi-directional antenna. Where a multi-directional antenna is utilized, the antenna 7 may include 3, 4, 5, 6, 7, 8, or 9 elements covering any suitable angle. For example, the antenna 7 depicted in FIG. 1 is a multi-directional antenna with six elements whereas the antenna 7 depicted in FIG. 2 is a multi-directional antenna with three elements. Of course, any of the antenna arrangements discussed above may be utilized as any of the antennas 7 discussed herein and shown in the drawings. In exemplary embodiments, the antennas 7 are arrays of wave guide antennas suitable for detecting microwaves in a plurality of different directions.

Filter

The filter 3 may be variously configured. In exemplary embodiments, the filter 3 is a wave guide cavity filter suitable for transmission of high frequency signals such as microwave signals. For example, the filter 3 may be configured as a bandpass wave guide cavity filter as shown in U.S. Pat. No. 5,936,490 entitled Bandpass Filter, filed on Jul. 29, 1997, to Rafi Herstig, which claims the priority of provisional U.S. Patent Application No. 60/022,444 to Rafi Herstig, filed Aug. 6, 1996 (herein incorporated by reference). In alternate embodiments, the filter 3 may be configured to be a high-pass, low-pass, or band-pass filter. Where a band-pass filter is selected, the filter may be a symmetric or asymmetric filter. The filter 3 may be configured to include a one or more transmission zeros adjacent to and/or near the passband. For example, where a symmetric filter is utilized, the filter may include at least one transmission zero on each side of the pass band with similar transmission characteristics.

Where the filter 3 is a wave guide cavity filter, it may be desirable to utilize a high Q dielectric puck within the wave guide cavity. It may be desirable to maximize the unloaded Q at room temperature. For example, the high dielectric puck may have a dielectric constant which ranges from 19–44, from 21–30, and/or from 29–29.5. In configuring the wave guide cavity filters, it is helpful to optimize the quality factor Q of a ceramic puck for a particular configuration at cryogenic temperatures. A dielectric constant of about 29 to 29.5 may provide a low insertion loss and corresponding low noise figure for many applications. In applications where an extremely low noise figure is not essential, the dielectric constant may vary outside of these ranges. Suitable dielectric pucks are available from any of a number of well known sources such as Morgan Matroc, located in England or Control Device Industries (CDI) located in New Hampshire.

In exemplary embodiments, due to differing thermal coefficients of expansion, the ceramic pucks may not be fixed directly to the metal enclosure forming the cavities of the wave guide. Since the coefficient of expansion of the ceramic pucks is very low in terms of PPM per degree C., the ceramic pucks may be mounted on a low loss dielectric stand-off such as those made of Lexan™ or ceramic. The ceramic pucks may be specified to have either positive expansion characteristics (+PPM) or negative expansion characteristics (−PPM). For example, ceramic pucks come in PPM ranges of plus or minus 0 to 2 PPM. Additionally, ceramic pucks are available with a positive PPM of from 0–5.

The wave guide cavity filter may be designed such that it meets minimum performance specifications at any temperature. In this manner, if the cryogenic refrigeration unit 8 becomes inoperative, the filter 3 and/or LNA 4 may continue to operate within minimum specifications. Accordingly, it may be desirable to select materials which either have low expansion characteristics or which have matched expansion characteristics such that the filter will remain tuned over the entire operating range. For example, it may be desirable to compensate for changes in the cavity size by utilizing a ceramic puck with a negative PPM. The performance characteristics for the filter may be determined at any given temperature range for particular components using well known filter design and simulation techniques. However, due to the minimal expansion of the puck over the cryogenic temperature range, any suitable positive or negative PPM will usually be sufficient to meet the performance specifications over the entire expected operational range.

It has been found that a loaded "Q" of the filter is improved, when cooled to 125 Kelvin, by a minimum of an additional 20%. This is a remarkable improvement over conventional filter arrangements while adding only minimal cost to the base station.

It has also been found that the use of ceramic tuning disks instead of metal screws, and/or low loss ceramic standoffs, will further increase the Unloaded "Q" of the cryogenic filter by an additional 10–15%. These measures can further reduce the Insertion-Loss in front of the low noise amplifier (LNA) and improve the NF level.

A further advantage of the cryogenic filters is their power handling capabilities. For example, the cryogenic filters have a power handling capability on the order of 100 watts. Although not in the transmit path, in some antenna configurations, it is important that even the Receive filter should sustain moderate power levels. For Transmit filters that require low insertion loss and high power handling, the same approach can be applied, which can make the design and integration more versatile. By introducing heat sink devices, such as, ceramic standoffs made of Beryllium, increased power handling is possible.

High Q ceramic resonators permit enhanced performance for wireless communication. As a building block of wave guide filters, they exhibit the following characteristics:

Temperature stability on the order of +/-2 PPM. This implies that in terms of frequency drift, the filter performance remains nearly constant, between room temperature and the lower operational cryogenic temperatures (e.g., 125 Kelvin).

Reliability. In the rare event of a cooling failure, a small degradation in the noise figure (NF) (about 1 db) will be observed. Nevertheless, the receive path will continue to maintain an RF link. Furthermore, failure detection circuitry and by-pass switches, which are often being used in a superconducting module, are not necessary.

The Unloaded "Q" for a 2.4" cavity diameter is typically 25,000, at 300 Kelvin. These characteristics when incorporated in a quasi-elliptic design results in a very low-loss and sharp roll-off filter. Such response is perfect for attenuating co-channel interference, and may be improved with a reduction of the temperature of the filter to cryogenic temperature ranges.

Low Noise Amplifier (LNA)

The low noise amplifier 4 (LNA) may be variously configured. Typically, the low noise amplifier is selected based on a particular customer's configuration as is well known in the art. The LNA may be supplied, for example, by MWT in California, JCA, and./or Mitec.

Receive Circuitry:

The receive circuitry 6 may be variously configured, but typically includes conventional receiving circuitry for before mixing the signal with a local oscillator for down conversion and de-modulating.

Cryogenic Refrigeration Unit:

As defined in the present specification, cryogenic temperatures are those of temperatures above the maximum upper limit of current high temperature super conductors (HTS). For example, the cryogenic refrigeration unit according to the present invention may produce cooling temperatures above the upper practical limit of current HTS technologies, above about 90 degrees Kelvin, between about 93 and 250 degrees Kelvin, between about 100 and 200 degrees Kelvin, between about 110 and 190 degrees Kelvin, and/or between about 125 and 175 degrees Kelvin. In general, depending on the particular cryogenic refrigeration unit 8, it is desirable to produce temperatures less than 175 degrees Kelvin and above HTS temperatures. Unlike the HTS temperature ranges (e.g., 77 K.), cryogenic temperatures, as defined by the present specification, are easily achievable using low-cost and highly reliable refrigeration equipment. Cryogenic filter and/or a cryogenic LNA are those filters and/or LNAs being operated at cryogenic temperatures.

Figure 18:
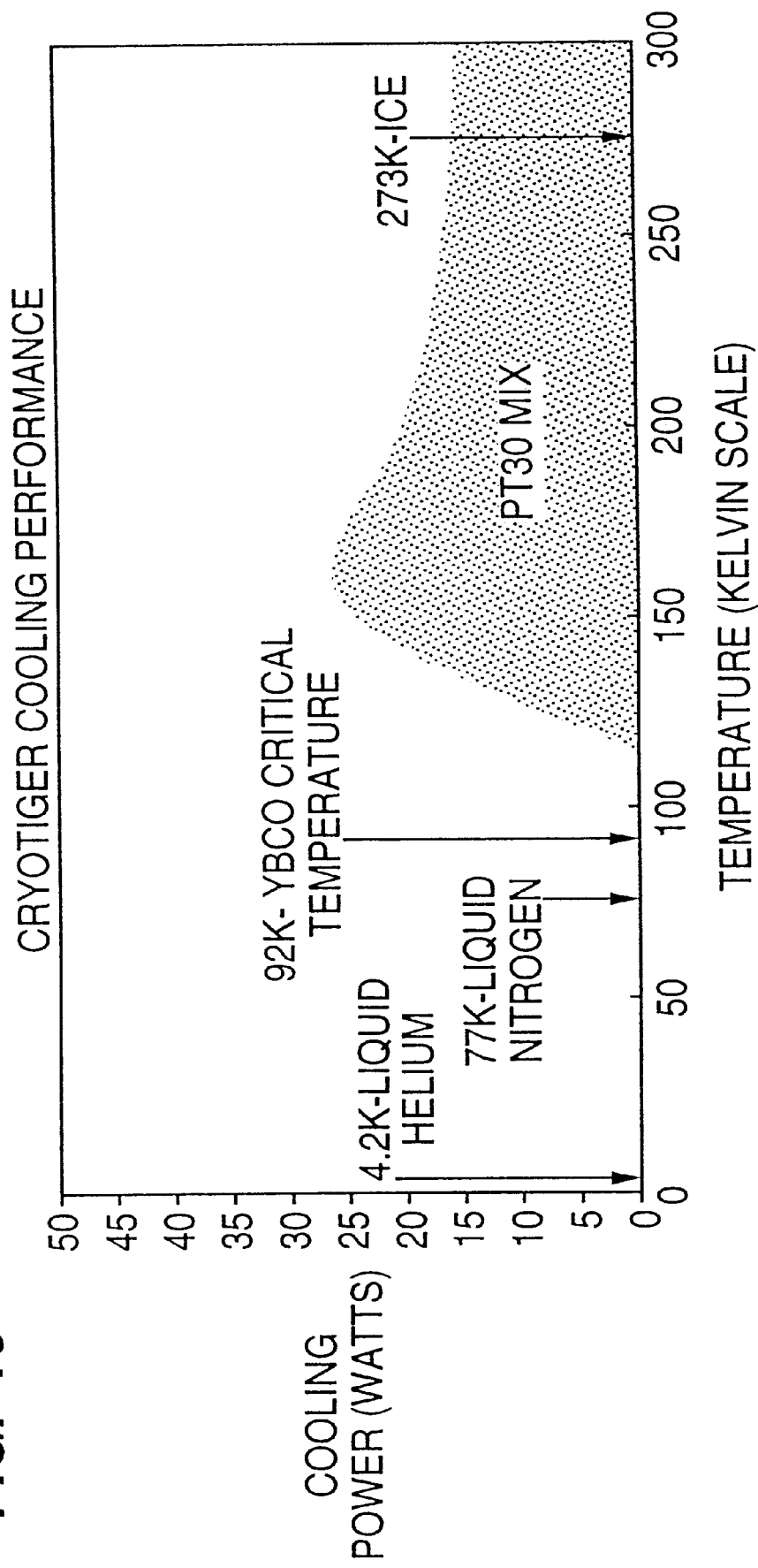
FIG. 18 shows the cooling performance of an exemplary cryogenic cooling system.

One approach to cryogenic cooling is to use a simple, standard refrigeration technology, which has been extended to cryogenic temperatures. For example, the CryoTiger™, manufactured by Intermagnetics' subsidiary, APD Cryogenics, Inc is suitable for producing cryogenic temperature ranges as shown in FIG. 18. FIG. 18 shows the power consumption of the CyroTiger™ refrigerator for different temperatures. This approach provides good reliability, efficiency, and compactness, without adding overbearing cost to the system. Unlike Gifford-McMahon and Sterling cycle coolers, the cold end contains no moving parts and has a high mean time between failures (MTBF) of over 100,000 hours. Thus, this unit may be more reliable than other units and particularly suitable for microwave applications.

The CryoTiger™ throttle-cycle refrigerator is based on Joule-Thomson expansion of a gas through a throttling valve into an expanded space. The expansion valve and counter-flow heat exchanger contain no moving parts, and a reliable, oil lubricated compressor does all the work required for the refrigeration system. The compressor may be variously configured, but typically runs on standard 115 VAC and uses less than 500 watts of input power. The performance of the refrigeration system can be gauged in terms of its ability to achieve low temperatures with adequate heat removal capacity. FIG. 18 shows the CryoTiger™ cooling capacity when using a mixture of PT30 gas. Note that the CryoTiger™ has significant cooling capacity at temperatures less than 200 degrees Kelvin, for example, between 125 and 180 degrees Kelvin.

The CryoTiger's™ combination of reliability, efficiency, compactness, and performance (low temperatures and adequate heat removal) may be advantageously utilized in this type of this application. The CryoTiger™ is currently in production, and system costs can be reduced substantially in volume.

The design of the CryoTiger™ (i.e., the cooling arrangement 37, and cooling generation unit 21) is that of Intermagnetics General Corporation, Latham, N.Y.

A variety of different gas mixtures can be utilized, providing a selection of different characteristic curves. The 120–150 K-temperature range is moderate since it can be reached easily by the cooling system and substantial benefits can be gained in microwave performance. Further, unlike filters based on superconductors, a loss of cooling does not cause a catastrophic change in performance. Thus, wireless communication system 1 including the cryogenic refrigeration unit 8 may be periodically maintained without installing expensive back-up systems. Thus, the refrigeration unit 8 may be taken off-line to recharge the gas mixture and/or replace the compressor without a catastrophic change in performance of the system.

Figure 19:
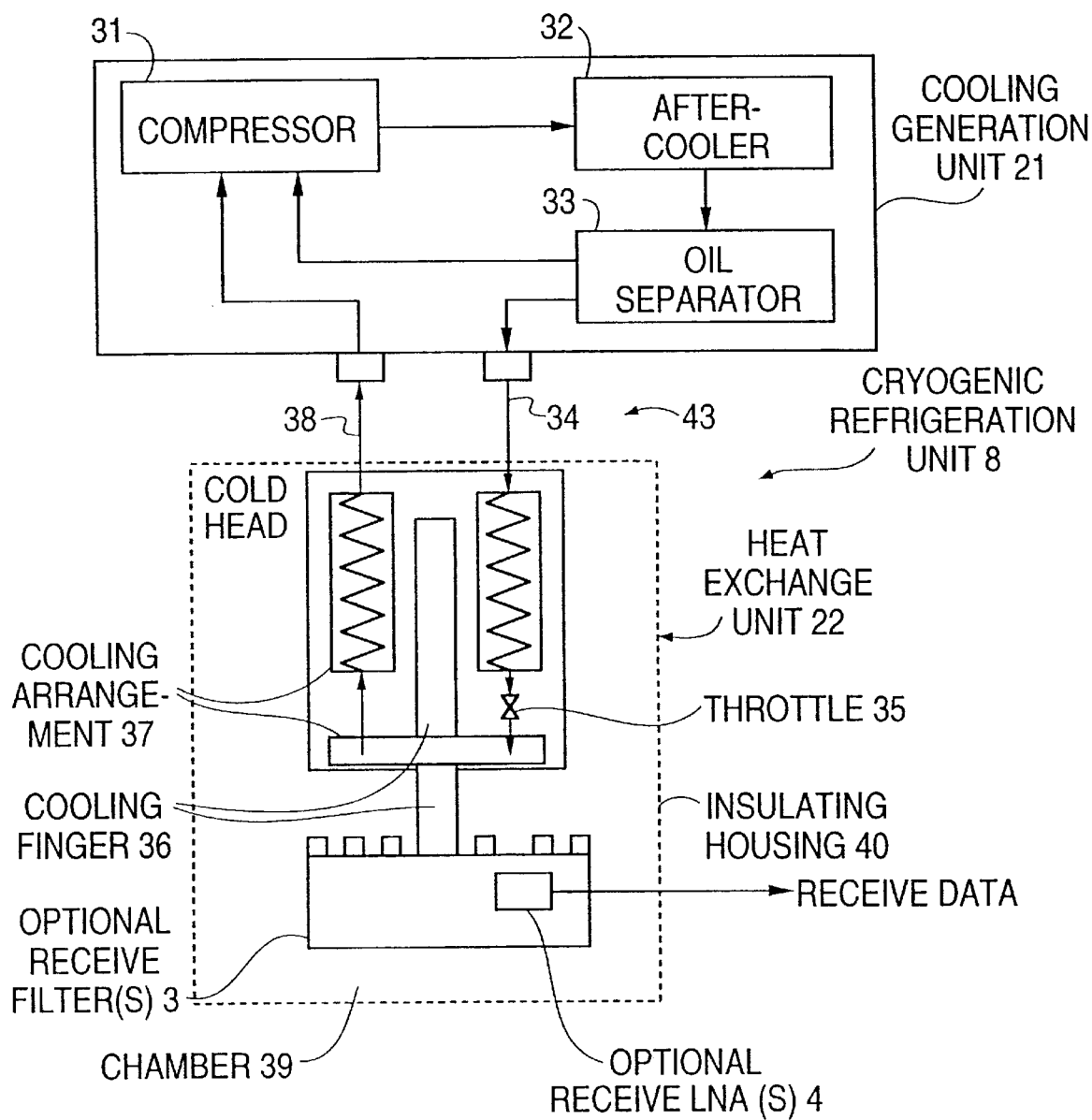
FIG. 19 shows a block diagram of an exemplary cooling system.

Referring to FIG. 19, an exemplary embodiment of a typical cryogenic refrigeration unit 8 includes a cooling generation unit 21 coupled to a heat exchange unit 22. As discussed above, the cooling generation unit 21 may be mounted either in close proximity or at a distance from the heat exchange unit 22. For example, the cooling generation unit 21 may be variously configured to include a compressor for compressing a fluid (e.g., a PT30 mix), an after-cooler 32 for removing heat from the compressed fluid, an oil separator 33 for removing oil from the cooled compressed fluid, and/or a high pressure line 34 for outputting the cooled, compressed, and separated fluid to the heat exchange unit 22. The heat exchange unit 22 may be variously configured to include a throttle 35 to control the expansion of the cooled, compressed, and separated fluid, a cooling finger 36 disposed in close proximity to the cooling arrangement 37 to effect a heat exchange between the cooling finger 36 and the cooling arrangement 37, and/or a low pressure return line 38. The low pressure return line 38 may be variously configured for returning fluid back to the compressor 31 in the cooling generation unit 21. The low pressure return line 38 and high pressure line 34 together form forward and return pipes 43.

The heat exchange unit 21 may also include a chamber 39 which may be sealed and evacuated. Evacuation of the chamber allows the filter and/or LNAs to be thermally isolated from the outside environment while being coupled directly to the cooling finger 36 of the heat exchange unit 22 to allow for easy cooling to cryogenic temperatures. Thus, the filters 3 and/or LNAs 4 are sufficiently thermally isolates to allow the cryogenic refrigeration unit 8 to cool them down with tolerable heat leak (wattage) levels. Additionally, the chamber 39 may be insulated by an outer insulating housing 40.

Where a cooling finger extends from, for example spirally wound copper coils in the cooling arrangement 37, it may be desirable to configure the cooling finger to extend into a vacuumed portion of chamber 39. Further, the cooling finger 36 may be configured to be in direct contact with one or more the LNAs 4 and/or one or more filters 3. The cooling finger 36 may be variously cooled such as sitting in a cooling chamber which is surrounded by copper spiral tubes which contain the expansion of fluids.

The chamber 39 may also include one or more LNAs 4 and/or filters 3. In exemplary embodiments of the invention, the cooling finger 36 is coupled directly to the filter 3 and/or the LNA 4. Where both a LNA 4 and a filter 3 is utilized, it is desirable to mount the LNA 4 near the output of the filter 3 to minimize the amount of conductor after the filter 3 and before amplification by the LNA 4. In this manner, the noise factor NF is further reduced.

The equation for calculating thermal budget is given by:

$$\dot{Q} = kA \frac{\Delta T}{\Delta x} \Big|$$

Where the cooling (or heating) power Q (Watts) required depends on the thermal conductivity k of the medium (in Watts per cm per Kelvin), the temperature difference $\Delta T$ (in Kelvin), and the length $\Delta x$ and area A of the conduction path. Multiple heat conduction paths are summed. Thermal conductivity is also generally temperature dependent. Thermal resistance is analogous to electrical resistance, with temperature drops analogous to voltage drops, and wattage in analogy to electrical currents.

Another consideration involves the necessary microwave connections to the filter and LNA—ideally, these would have low microwave loss but also low thermal conductivity. Conventionally, these two objectives are not compatible. The low thermal conductivity is required to minimize the conduction out of the heat exchange unit 22 via the external electrical connections. A reasonable trade-off between heat conduction and conductivity may be accomplished by using stainless steel coaxial cables, with somewhat higher microwave losses than copper, but far better thermal properties. The filter and LNA are securely linked to the cold head, so as to achieve a low thermal resistance. The microwave components are buffered from the ambient temperature via chamber 39 and kept reliably cold.

Figure 20:
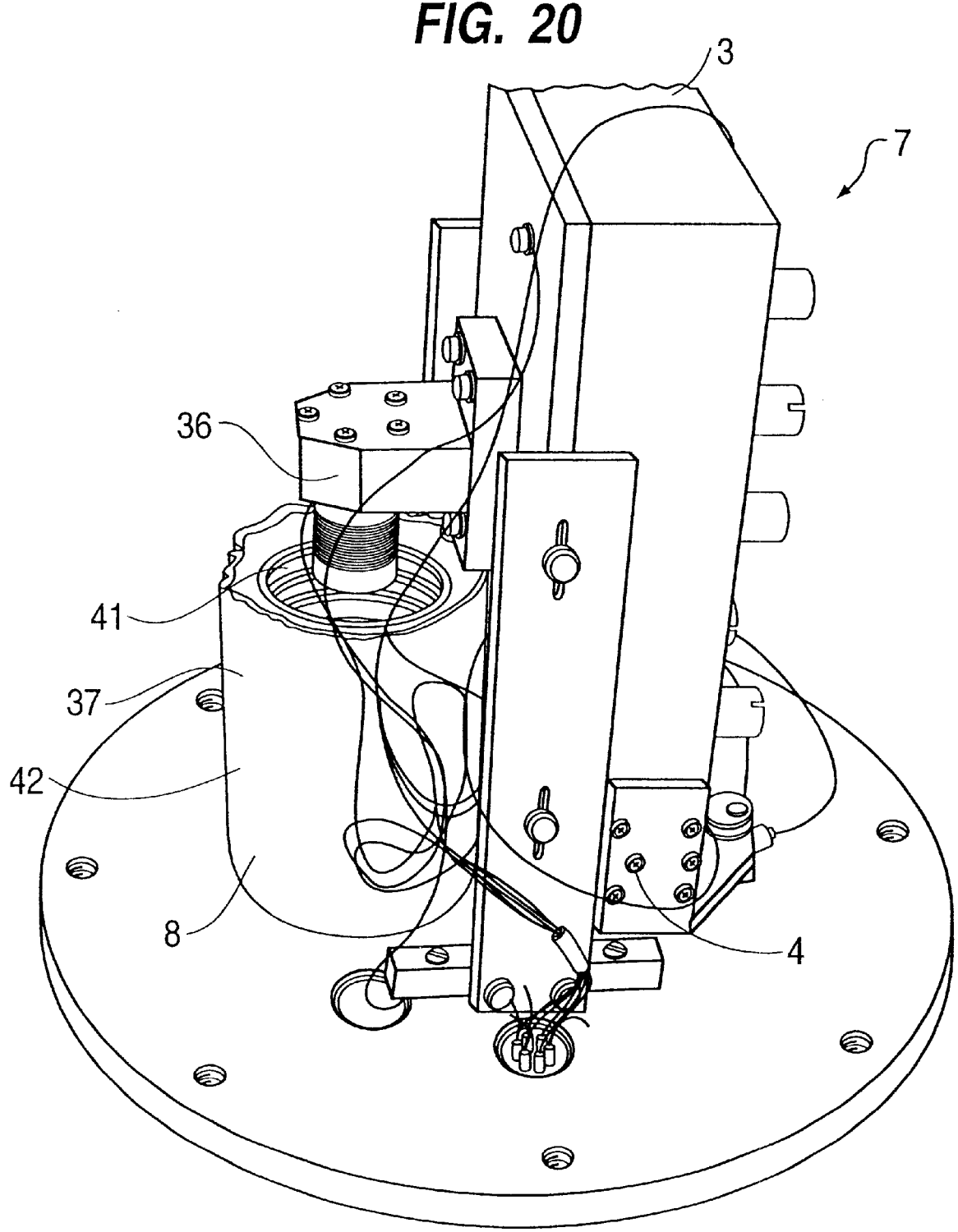
FIG. 20 shows a perspective view of a waveguide cavity filter coupled to a cooling finger at one end.

FIG. 20 shows a perspective view of a wave guide cavity filter 3 coupled to a cooling finger 36 at one end. The other end of the cooling finger 36 may be dispose in a cooling arrangement 37 having a plurality of coiled copper tubes 41 surrounding the cooling finger 36. The coiled copper tubes 41 may be disposed in an internal chamber 42 which may or may not include a heat exchange fluid (not shown) for facilitating heat exchange between the cooling finger 36 and the coiled copper tubes 41. In the exemplary embodiment shown in FIG. 20, both a filter 3 and a LNA are coupled to the cooling finger 36. In particular, the LNA 4 may be mounted on the filter 3 (e.g., at a location close to the output of filter 3) and the filter 3 may in turn be coupled to the cooling finger 36. In this manner, the metallic mass of the filter 3 serves as an extension of the cooling finger 36.

Figure 21:
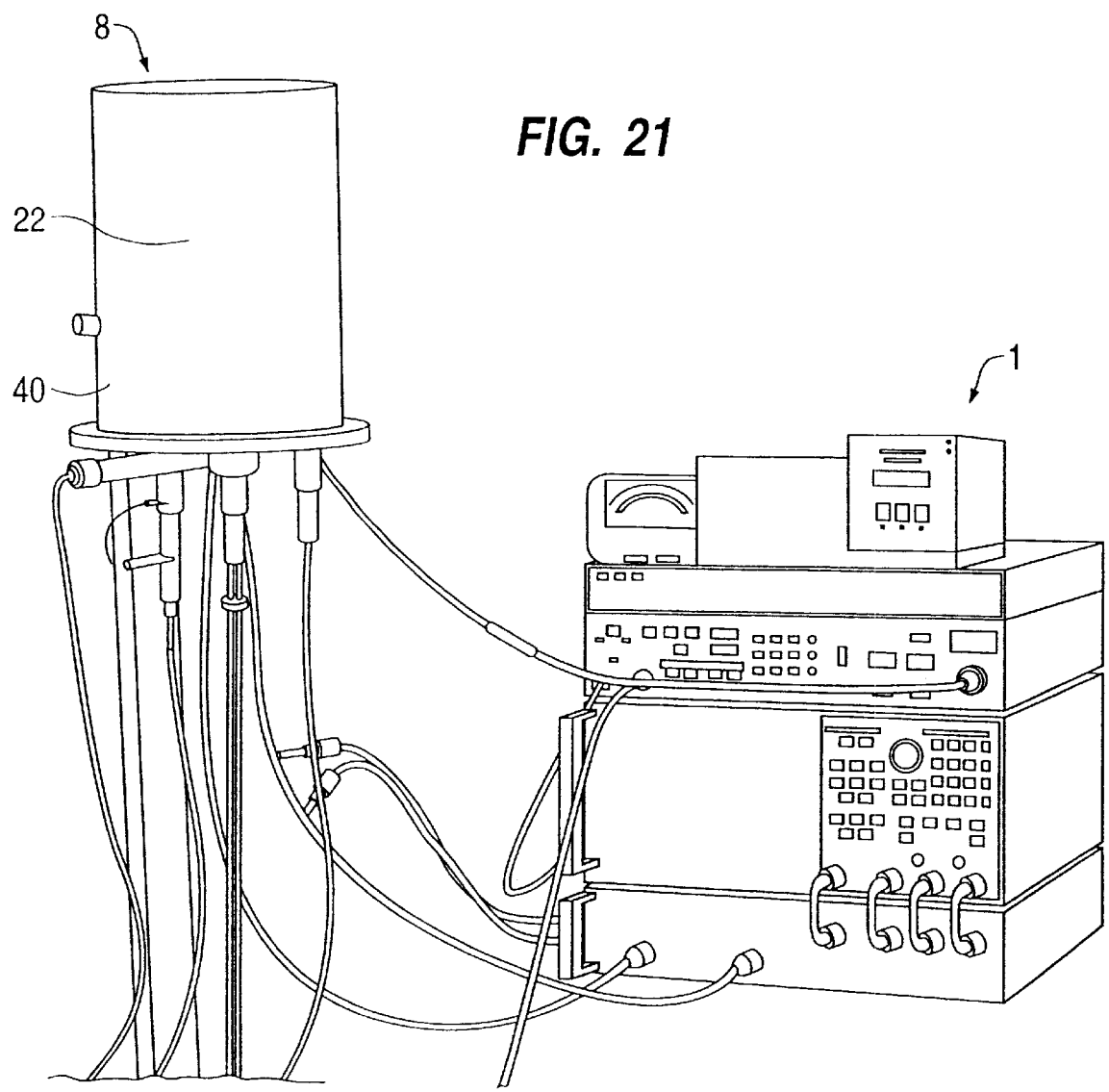
FIG. 21 shows a cryogenic refrigeration unit having a heat exchange unit protected by an outer insulating housing.

FIG. 21 shows an exemplary embodiment of the cryogenic refrigeration unit 8 where the heat exchange unit 22 is protected by an outer insulating housing 40.

In operation, the cryogenic architectures discussed above have significant advantages over conventional wireless communication systems.

Operational Comparisons Between Cryogenic and HTS Systems

FIG. 22 provides a chart comparing the performance characteristics of cryogenic systems according to the present invention with those of HTS systems. It can be seen from FIG. 22 that cryogenic filters exhibit nearly ideal symmetric/asymmetric elliptical response whereas planar HTS filters have a skewed response. Further, unlike HTS filters, cryogenic filters have a unloaded Q which is acceptable over the entire operational range. Additionally, since the cooling capacity and temperature stability of cryogenic architectures is substantially higher than HTS filters, it is possible to use all of the cryogenic architectures discussed above with the transmit filter(s) and/or LNA(s) as well. In these configurations, transmit LNA(s) 4 may be output to transmit filter(s) (3) in tower mounted configurations where either the LNA(s) 4 and/or the filter(s) 3 are cooled in the same manner above as discussed with regard to FIGS. 1–17 except on the transmit side. Further, as shown in FIG. 22, cryogenic architectures have greater reliability and lower cost.

Additionally, cryogenic architectures have greater temperature stability than HTS architectures. In exemplary embodiments, it is often desirable for the cavity filter 3 and LNA 4 to have excellent temperature stability characteristics. For example, as the filter 3 and LNA 4 are operated, heat will be generated by these components. This heat will generate a certain amount of temperature fluctuations within the chamber 39. This is particular true where the capacity of the cryogenic refrigeration unit 8 is closely matched to the anticipated power consumption of the cooled devices (e.g., LNA(s) and/or filter(s) 3) to save costs.

For the cryogenic ceramic filters/LNAs, the typical temperature drift is less than 2 ppm per degree centigrade. By contrast, HTS devices have electrical characteristics which degrade dramatically when the ambient temperature is above the transition temperature. Accordingly, HTS devices exhibit extreme temperature instability. For example, the temperature instability of HTS devices is approximately 100 ppm per degree centigrade at 60 K and approximately 1000 ppm per degree centigrade at 77 K. Thus, the temperature instability of HTS devices may be as much as 500 times that of embodiments of the present invention. Thus, a small change in temperature of a HTS device has a huge impact in the performance of the device, which in turn generates more heat. The more heat generated causes the device to deteriorate further and thermal runaway occurs after the device passes the mid-point. By contrast, the cryogenic architectures of the present invention are capable of handling substantially more heat than HTS devices and do not suffer from thermal runaway.

Figure 23:
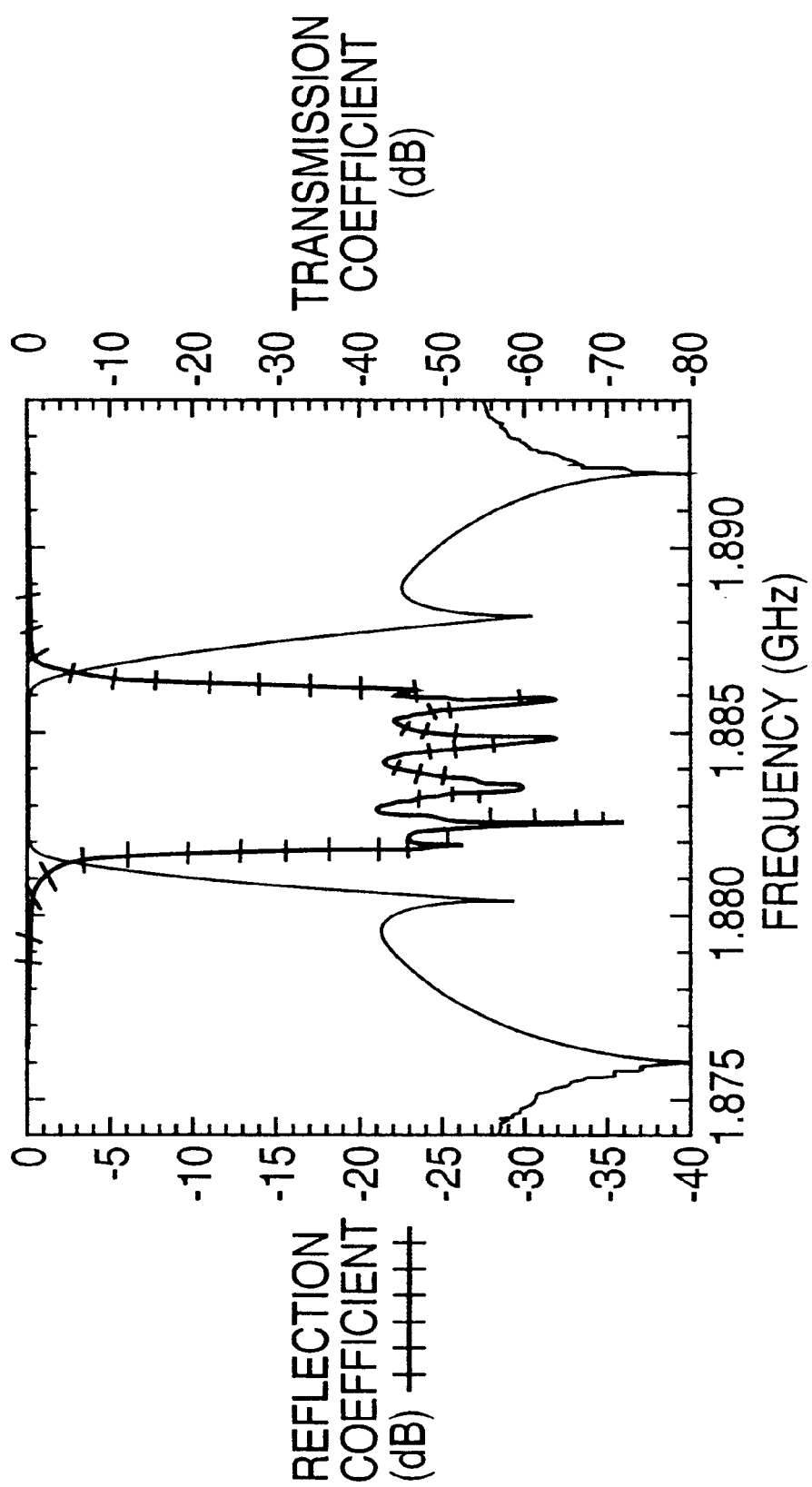
FIG. 23 shows a measured response of wave guide cavity filter having ceramic resonators.

A further advantage of the cryogenic architectures of embodiments of the present invention is that either for a symmetric or an asymmetric filter may be utilized. For example, FIG. 23 shows the measured reflection and transmission coefficients for a wave guide cavity filter cooled to 150 K. The heavy line with cross hatches is the curve which represents the reflection coefficient. The other line represents the transmission coefficient. As shown in FIG. 23, a superior quality transfer function may be realized with the cryogenic filter. It is possible to construct a cryogenic filter according to embodiments of the present invention with a perfectly symmetrical transfer function. By contrast, it should be noted that current HTS filters are limited to a monotonic transfer function without the advantageous placement of transmission zeros.

It has been found that the cryogenic filters exhibit temperature stability and other robust design features which permits fine-tuning at cryogenic temperature, e.g., 125 Kelvin. A conventional wave guide test fixture may be utilized to facilitate fine-tuning the last stages of the filter in production, e.g., for matching the limited input VSWR of the LNA. Since the LNA design is a trade-off between Gain, NF, Bandwidth and the third order intercept point (IP3), it may be helpful to provide fine-tuning which can produce an excellent input match as seen by the antenna. In the tuning process, the resonant frequency, the mutual coupling values and the external "Q" are adjustable. With such flexibility, the transmission zeros can be placed upon request in the cryogenic filter architectures, depending upon local interference.

Additionally, since all of the components of the cryogenic filter architectures discussed above are convention (e.g., without exotic and brittle HTS materials), customized filters can be produced with short turn around times. Since none of the components of the cyrogenic filter are exotic, the design concept can support even high mix low quantities, making it a good candidate for "Patching" areas, which suffer from a high rate of "Drop Calls".

In reality, a service provider face several issues. First, coverage of the area is a main concern. An improved NF increases the B.T.S range, which immediately translates to fewer base stations per given area. When the number of subscribers increases, the concern becomes one of capacity. Generally, more base stations (under layer) are deployed, to sustain the rapid growth in the number of calls. Now it can be assumed that there are more (than before) service providers, (SP), operating in the same geographical area. When the concern shifts from the coverage of a large area to capacity, the need changes from improved NF to filters with sharp roll-off that can reduce co-channel interference. Under this circumstance, an improved NF does not have a direct impact on the B.T.S's capacity. Due to the deployment of the under layer, the signal to noise ratio increases. Between these two extreme scenarios, coverage of a large area with relatively low background noise power, and capacity issues with high co-channel interference, there are to be found all intermediate cases. In other words, the NF has to be improved by finite levels, maximizing the efficiency for the local terrain. Satisfying each of these operational environments is possible with the cryogenic architectures discussed above.

At the antenna level, new design enables increased gain while optimizing the directivity pattern. In addition to this, antennas with a built in LNA, can improve the NF by avoiding cable interconnections. Built-in LNAs may be cooled in the same manner as discussed above with the cooling finger 36 and/or filter 3 thermally coupled to the LNA. Portions of the antenna may alternately be encased by the insulating housing 40. Exploiting coaxial cable with larger cross sections can reduce the RF insertion loss in front of the LNA.

The following notes describe several options of architectures suitable for Tower Mounting Antenna, (T.M.A) and the associated NF improvements in comparison to the conventional approach. The possible trade off among the architectures will impact the cost dramatically. For instance, cooling the Ceramic Filter to cryogenic temperatures, e.g., 125 Kelvin improves the NF by ~0.6 db. Since this module avoids superconductivity, in cases where such an improvement can be tolerated, another attractive option will be to consider cooling the LNA only.

| Configuration | Remarks | Estimated NF Reduction |
| --- | --- | --- |
| Coax cable-Cavity Filter-LNA | Filter/LNA in BTS. Cable IL: ~2db (coax) | Reference |
| Cavity filter/LNA-Coax cable-bits | Filter/LNA at top of tower | ~2db reduction due to elimination of cable-loss |
| Filter-cooled (LNA)-Coax cable/BTS | Improved sensitivity | ~3db reduction due to low loss and temp. |
| Cooled (Ceramic filter-LNA)-Coax cable-BTS | Filter/LNA in a vacuum Sealed dewier at 125 Kelvin. Sharp roll-off, improved sensitivity | ~3.3db reduction due to minimum LL of the filter. |
| Superconductor Filter/LNA-Coax cable | Rounded roll off, improved sensitivity | ~3.5db. |

There are two main categories that wireless participants come under: Original Equipment Manufactures OEMs, and Service Providers (SP). From the OEM stand point, a base-station with improved NF will cover more area, therefore, fewer units are required. The needs of service providers are dynamically changing, and likely to be different from one geographical terrain to another. Service providers often have "patch" problem areas, which will result in high mix low quantity orders. On the other hand, for rural areas, which are being deployed for the first time, reduced NF modules are extremely useful.

Noise Figure

The background noise power, [Watts], is defined as the product of K*T*B, where K is Boltzmann's constant, T is the operational temperature [Kelvin] and B is the bandwidth [Hz]. A reduction of T or B will reduce the noise power. If the desired signal is passed with minimum loss, the background noise figure (NF) is then improved.

NF is defined as:

$$F = \frac{Si/Ni}{So/No}$$

and NF(dB)=10 LOG(F)

Where Si/Ni and So/No are the SNR at the input and at the output of the module respectively. For a component with no gain such as cables, the NF is defined as:

F1=1+(L−1)*T/To where:

L=the loss factor of the coaxial line.

To=290 Kelvin.

T=the operational temperature.

The following example will demonstrate the NF improvement of a coaxial cable due to cooling from 300 Kelvin (room temp.) to 150 Kelvin. Assuming that a coaxial cable has −2 db of Insertion Loss (equivalent to about 70 feet of coaxial cable), at 300 Kelvin the loss factor is:

L=10^(2/10)=1.58 and the NF is:

F1=1+(1.58−1)*300/290=1.6=2.04 db.

At 150 Kelvin the NF will be minimum of:

F1=1+(1.58−1)*150/290=1.3=1.14 db.

This example demonstrates the correlation between NF and operational temperature. The same analogy can be applied when dealing with band-pass filters. Here the bandwidth of the filter, as well as the insertion-loss are two contributors to the NF level. For a loss less band-pass filter, the noise power is K*T*B. Where:

K=1.38×10^(−34)J/K.

T is the temperature in degree Kelvin.

B is the bandwidth of the system in Hz.

From NF calculations of a cascaded RF chain, it is easily shown that when the module is placed at the top of the antenna, a lower NF is realized. Assuming that we have two RF components, 1 and 2. The cascaded NF of the combined components is given by:

NFcas=NF1+(NF2−1)/G1 where:

NF1=NF of the first component.

NF2=NF of second component.

G1=Gain of first component.

EXAMPLE 1

In an example of a cryogenic architecture according to the present inventions, the electrical specifications may, for example, require the realization of 4 finite transmission zeros (two on each side of the pass-band) and 8 infinite zeros (one at D.C. and 7 at Infinity). In total, the number of resonators required to realize this configuration may be: (4+1+7)/2=6. Accordingly, a filter design may be based on a canonic structure of N=6 resonators where in the main path, resonators 1,2,3 and 4,5,6 were magnetically coupled, while 3,4 and 1,6 were electrically coupled. To complete the realization of 2 transmission zeros on each side, resonators 1,6 were electrically coupled as well. Realizing two quadruplets of resonators, 2,3,4,5 and 1,3,4,6 can produce two transmissions zeros on each side, with two equal-minimal points, as required. The network was synthesized and the coupling values were calculated. Even-though the aim was to maximize the unloaded "Q", the filter was not fully optimized. For instance, the metallic tuning disk could have been replaced with a ceramic tuning disk. Furthermore, the resonators were supported by Lexan rods, which could be replaced by low loss Alumina standoffs. Such changes could improve the loaded "Q" by 5–15% for the test system describe here. Filter Insertion-Loss improved from 0.8 db at 300 Kelvin to 0.5 db at 125 Kelvin. A+2 ppm drift was observed, which was easily compensated by the tuning disks. In the future, ceramic resonators can be utilized with some negative (~−2 ppm) temperature coefficient, for improved stability.

Figure 24:
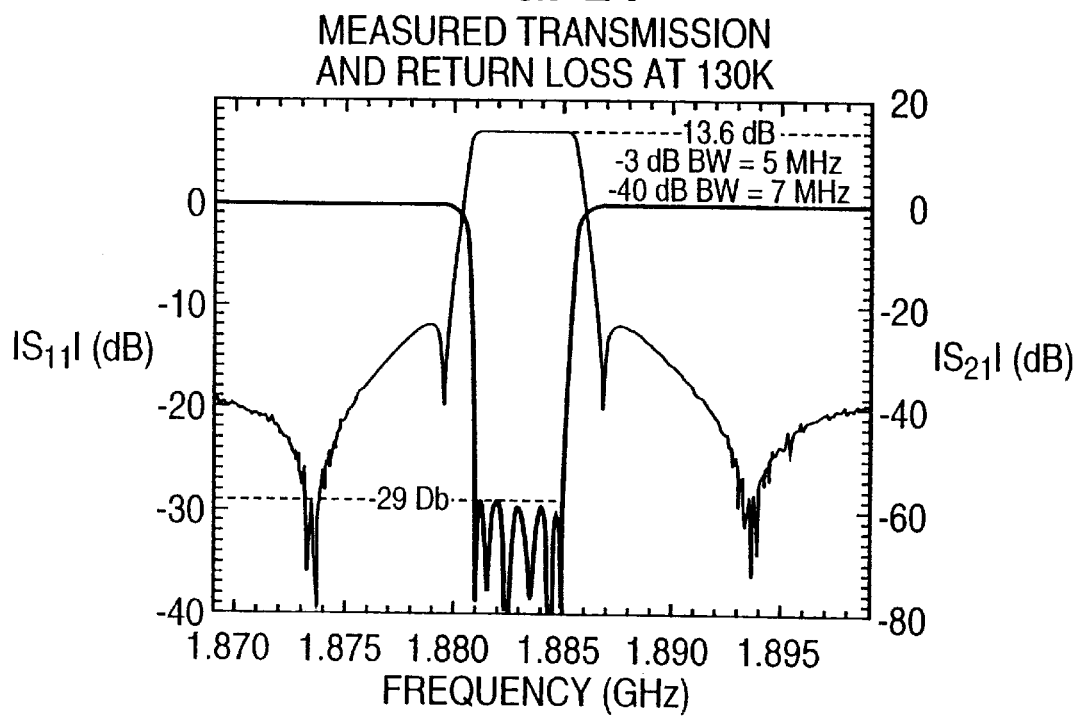
FIG. 24 shows a measured transmission and return loss of a sample filter cooled to 130 Kelvin.
Figure 25:
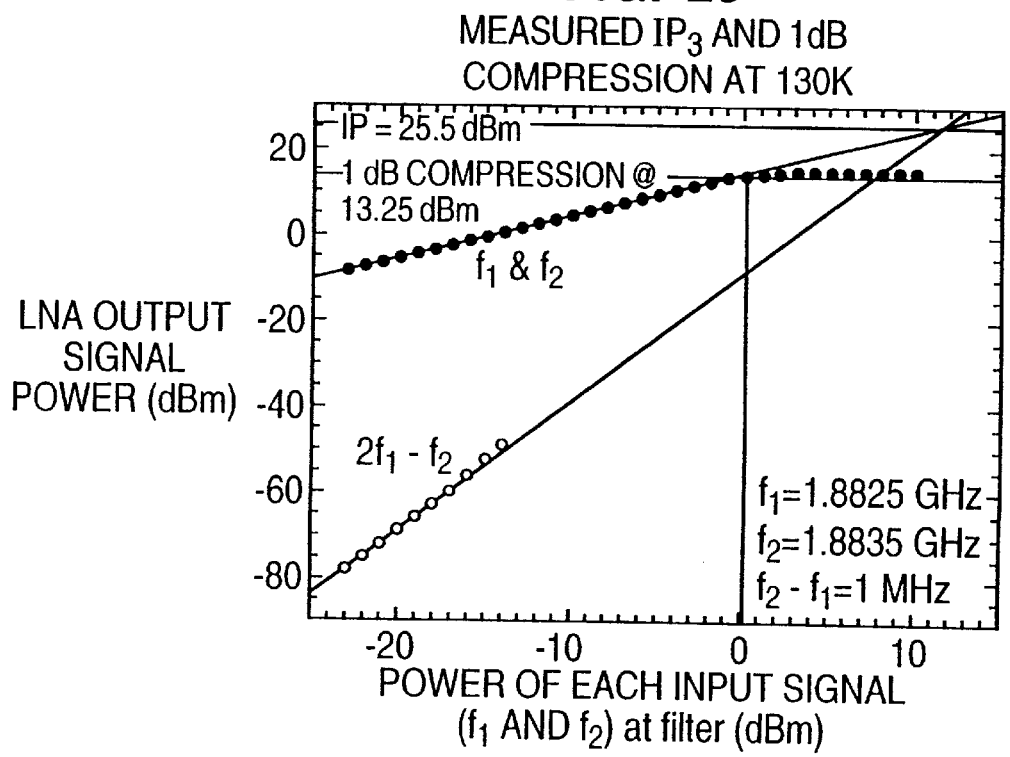
FIG. 25 shows measured $IP_3$ and 1 dB compression at 130 Kelvin.

Test of the above filter generated the following results. The Low Noise Amplifier was cascaded with the filter, and physically attached to the filter's housing, for thermal considerations. Thus, both the LNA and the filter were cooled to cryogenic temperatures, in this example 125 Kelvin. A tuning fixture was built for completion of the integration at 125 Kelvin. By fine tuning the last stages of the filter, input Return-Loss (as seen by the antenna) of −25 db was achieved. FIG. 24 show the measured transmission and return losses at different frequencies. A 1 db compression point and IP3 tests were conducted at 135 Kelvin. FIG. 25 shows the measured IP3 and 1 db compression point tests. It should be noted that the amplifier preserved its room temperature characteristics.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Furthermore, it will be understood that while some examples of implementations are discussed above regarding the receiving components (e.g., antenna-filter-LNA-receive circuitry), the same principals, configurations and methods may be applied to transmitting circuitry (e.g., transmit circuitry-LNA-Filter-Antenna). Accordingly, the appended claims are intended to cover all such alternate embodiments of the inventions.

I claim:

1. A wireless communication system comprising:

a heat exchange unit;

a wave guide cavity filter, located within the heat exchange unit, coupled to an input signal and producing an output signal;

a low noise amplifier coupled to the output signal and disposed external to the heat exchange unit;

a cryogenic cooling generation unit cooling the wave guide cavity filter to cryogenic temperatures; and wherein the output signal is an unamplified version of the input signal.

2. A wireless communication system comprising:

a tower having an upper section and a base section;

a heat exchange unit mounted on the upper section of the tower;

a wave guide cavity filter located within the heat exchange unit and having an output;

a low noise amplifier coupled to the output;

a cryogenic cooling generation unit mounted near the base of the tower and cooling the wave guide cavity filter to cryogenic temperatures.

3. A wireless communication system comprising:

a low noise amplifier;

a wave guide cavity filter coupled to the low noise amplifier through a thermal connection and configured to act as a heat sink for the low noise amplifier; and a cryogenic refrigeration system cooling the wave guide cavity filter and the low noise amplifier to cryogenic temperatures.

4. A wireless communication system comprising:

a heat exchange unit;

a wave guide cavity filter having an output and disposed external to the heat exchange unit;

a low noise amplifier located within the heat exchange unit and coupled to the output; and a cryogenic cooling generation unit cooling the low noise amplifier to cryogenic temperatures.

5. A wireless communication system comprising:

a tower having an upper section and a base section;

a heat exchange unit mounted on the upper section of the tower;

a wave guide cavity filter having an output;

a low noise amplifier located within the heat exchange unit and coupled to the output;

a cryogenic cooling generation unit mounted near the base of the tower and cooling the low noise amplifier to cryogenic temperatures.

6. A system comprising:

a cryogenic cooled container;

a waveguide cavity filter;

a cooling finger in thermal contact with the waveguide cavity filter and the cryogenic cooled container; and wherein the waveguide cavity filter occupies a first volume and a cooling head occupies a second volume which is substantially smaller than the first volume.

7. The filter system of claim 6, further including a low noise amplifier in thermal contact with the cooling finger.

8. A wireless communication system comprising a low noise amplifier having a thermal connection to a wave guide cavity filter and a cryogenic refrigeration system cooling the wave guide cavity filter and the low noise amplifier to cryogenic temperatures and the waveguide cavity filter acts as a heat sink for the low noise amplifier.

9. A method of operating a wireless communication system comprising the steps of:

providing a wave guide cavity filter within a heat exchange unit;

coupling an input signal to the wave guide cavity filter;

producing an unamplified filtered output signal with the wave guide cavity filter;

providing a low noise amplifier external to the heat exchange unit;

coupling the low noise amplifier to the unamplified filtered output signal; and cooling the wave guide cavity filter to cryogenic temperatures.

10. A method of operating a wireless communication system comprising the steps of:

mounting a heat exchange unit on an upper section of a tower;

providing a wave guide cavity filter within a heat exchange unit;

coupling a low noise amplifier to the wave guide cavity filter;

mounting a cryogenic cooling generation unit near a base of the tower; and cooling the wave guide cavity filter to cryogenic temperatures.

11. A method of operating a wireless communication system comprising the steps of:

providing a low noise amplifier;

coupling a wave guide cavity filter to the low noise amplifier through a thermal connection such that the wave guide cavity filter acts as a heat sink for the low noise amplifier; and cooling the wave guide cavity filter and the low noise amplifier to cryogenic temperatures.

12. A method of operating a wireless communication system comprising the steps of:

providing a low noise amplifier within a heat exchange unit;

directly coupling a wave guide cavity filter to the low noise amplifier;

disposing the wave guide cavity filter external to the heat exchange unit; and cooling the low noise amplifier to cryogenic temperatures.

13. A method of operating a wireless communication system comprising the steps of:

mounting a heat exchange unit on an upper section of a tower;

providing a wave guide cavity filter;

coupling a low noise amplifier to the wave guide cavity filter;

disposing the low noise amplifier within the heat exchange unit;

mounting a cryogenic cooling generation unit mounted near a base of the tower; and cooling the low noise amplifier to cryogenic temperatures.

* * * * *